Inventor:
Ernest J. Svenson
By Cox & Moore Attys.

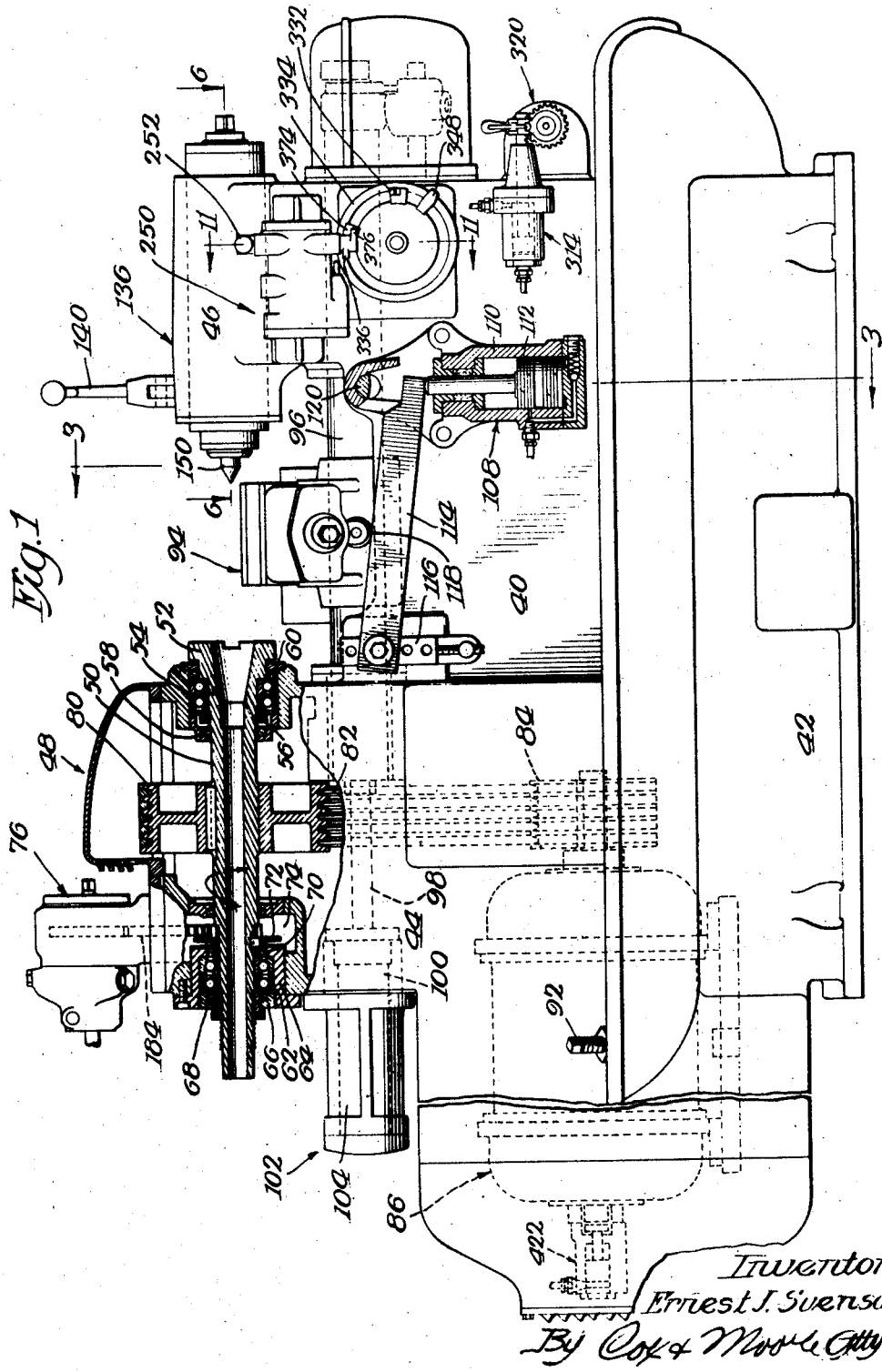

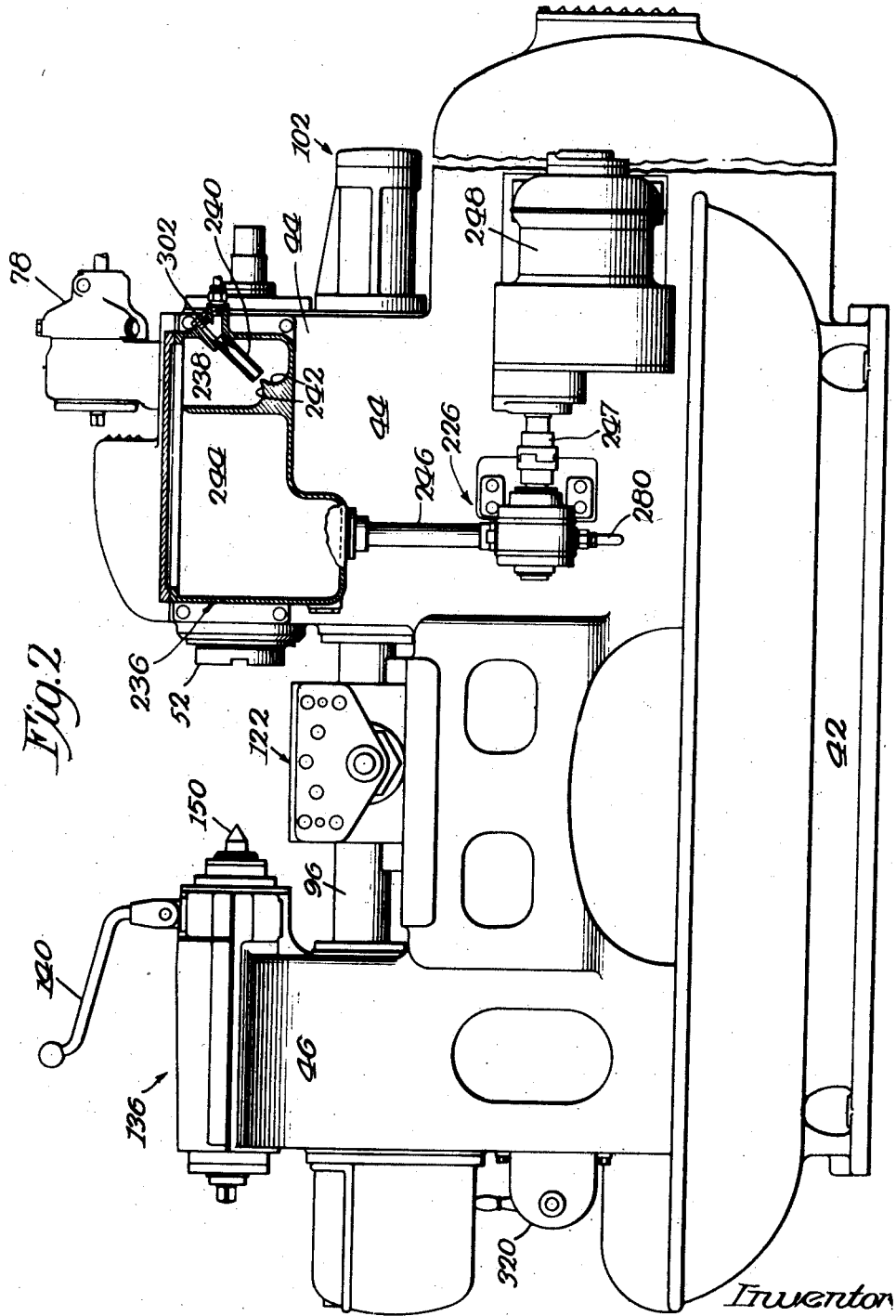
Sept. 17, 1940.  E. J. SVENSON  2,215,257
MATERIAL WORKING APPARATUS AND CONTROL THEREFOR
Filed Aug. 11, 1933  14 Sheets-Sheet 2
Inventor
Ernest J. Svenson
By Cox & Moore Attys.

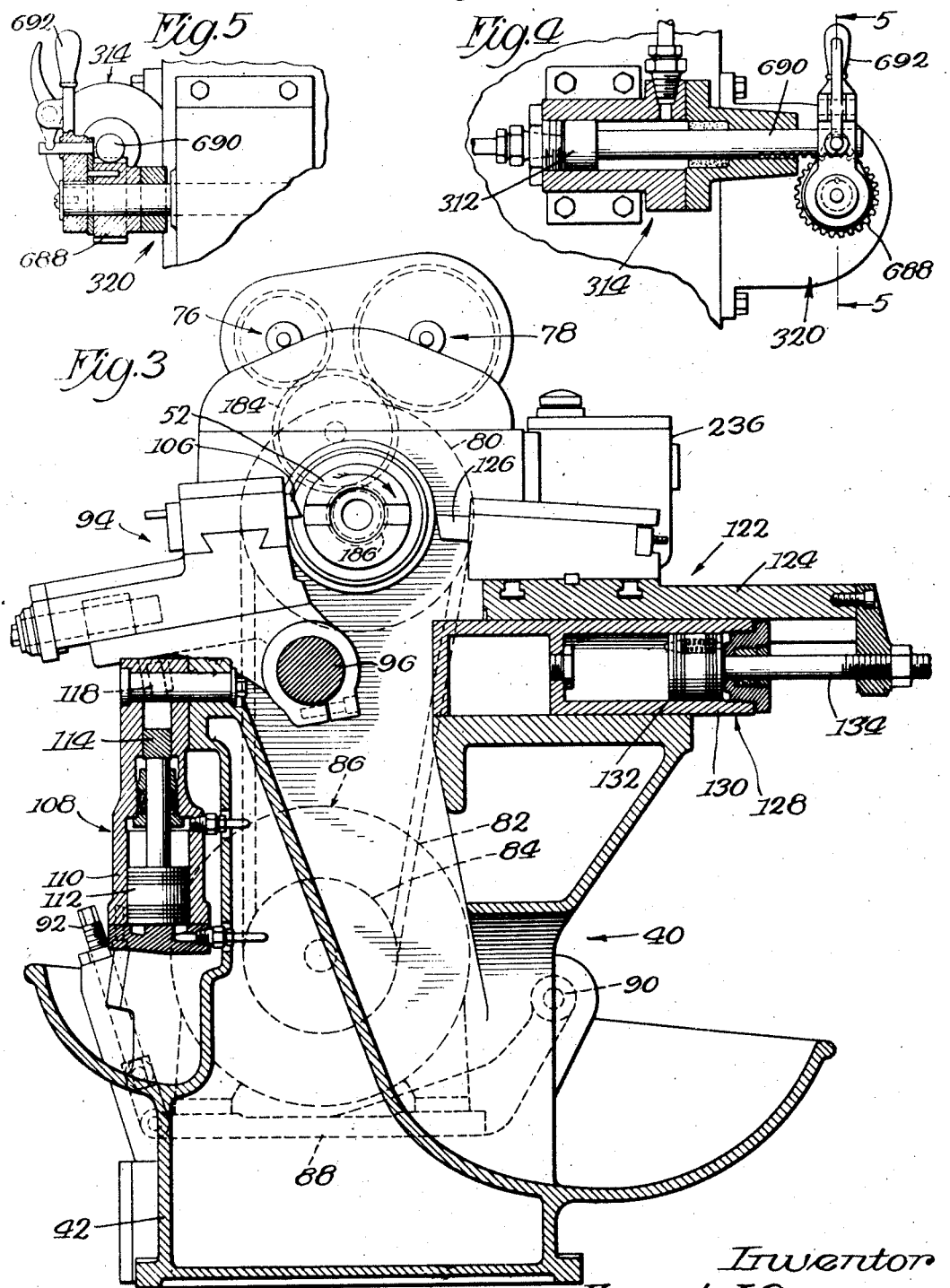

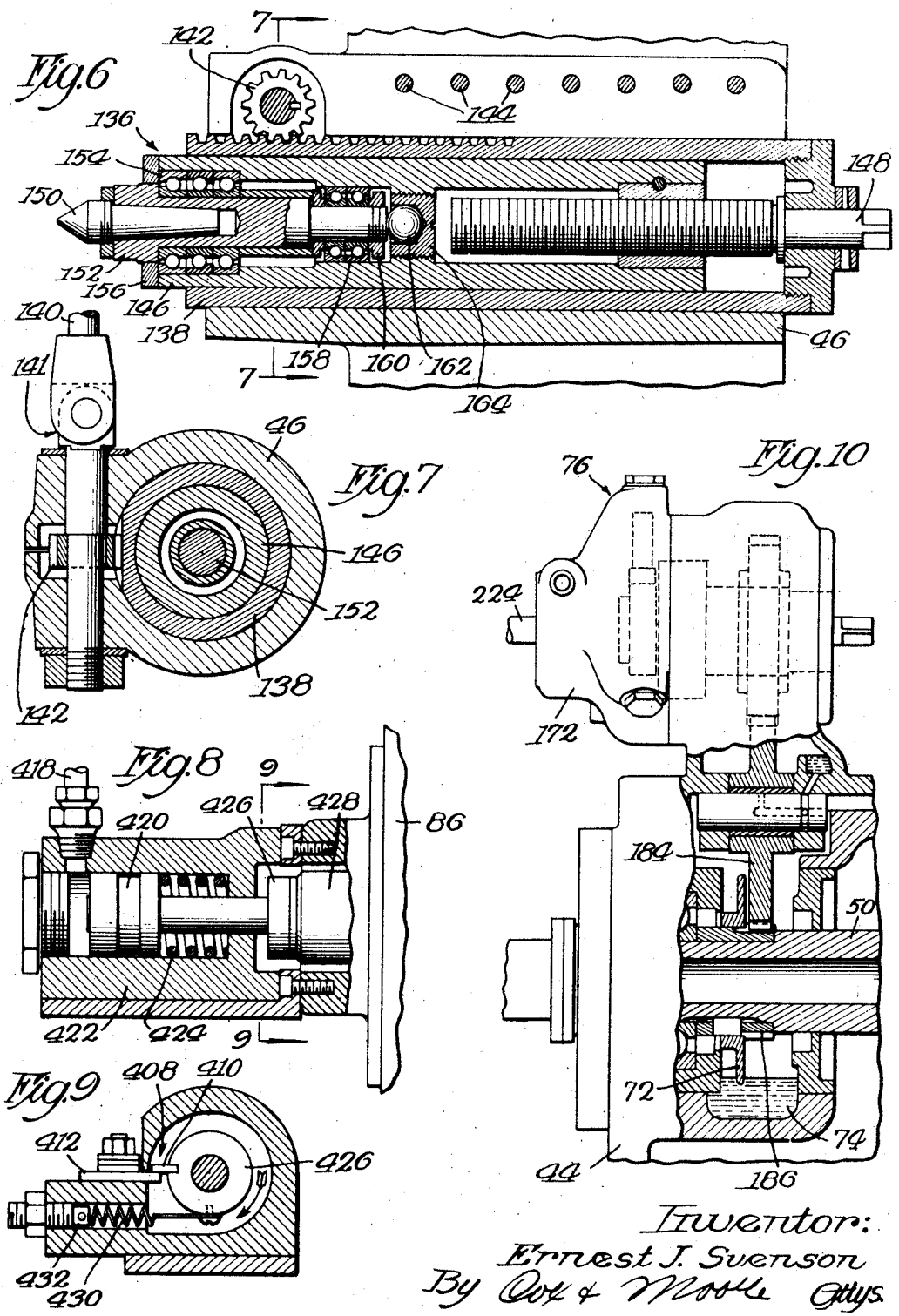

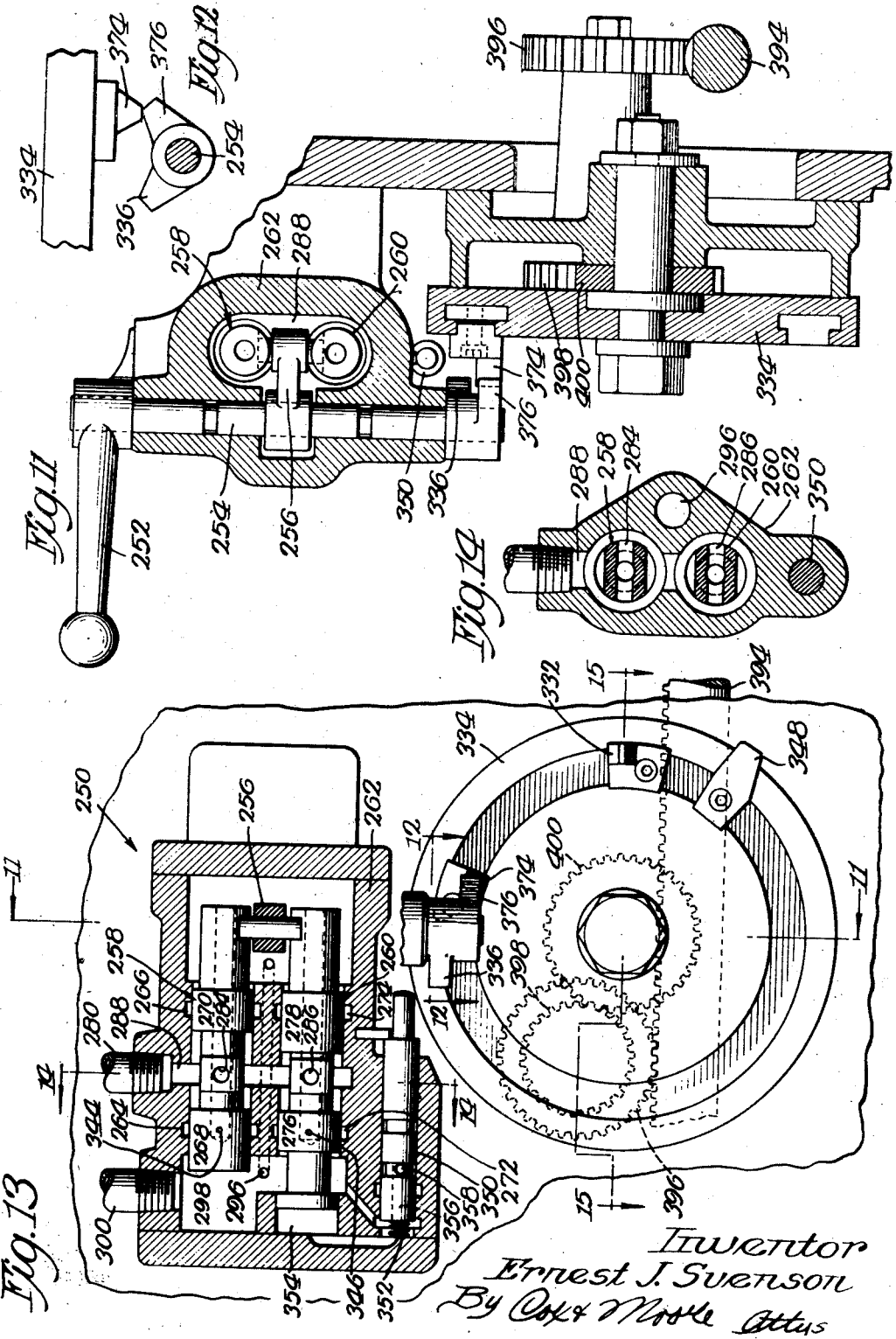

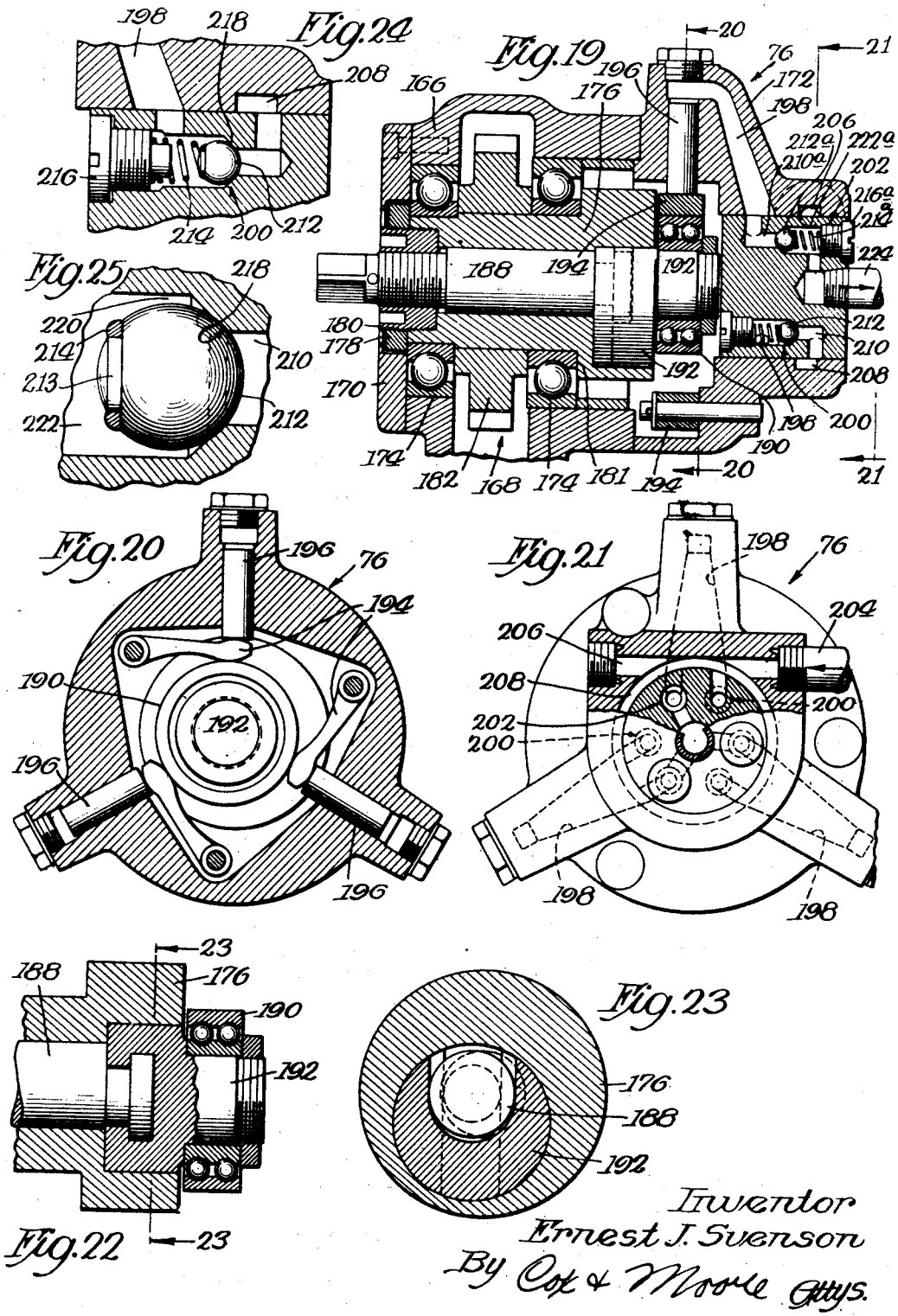

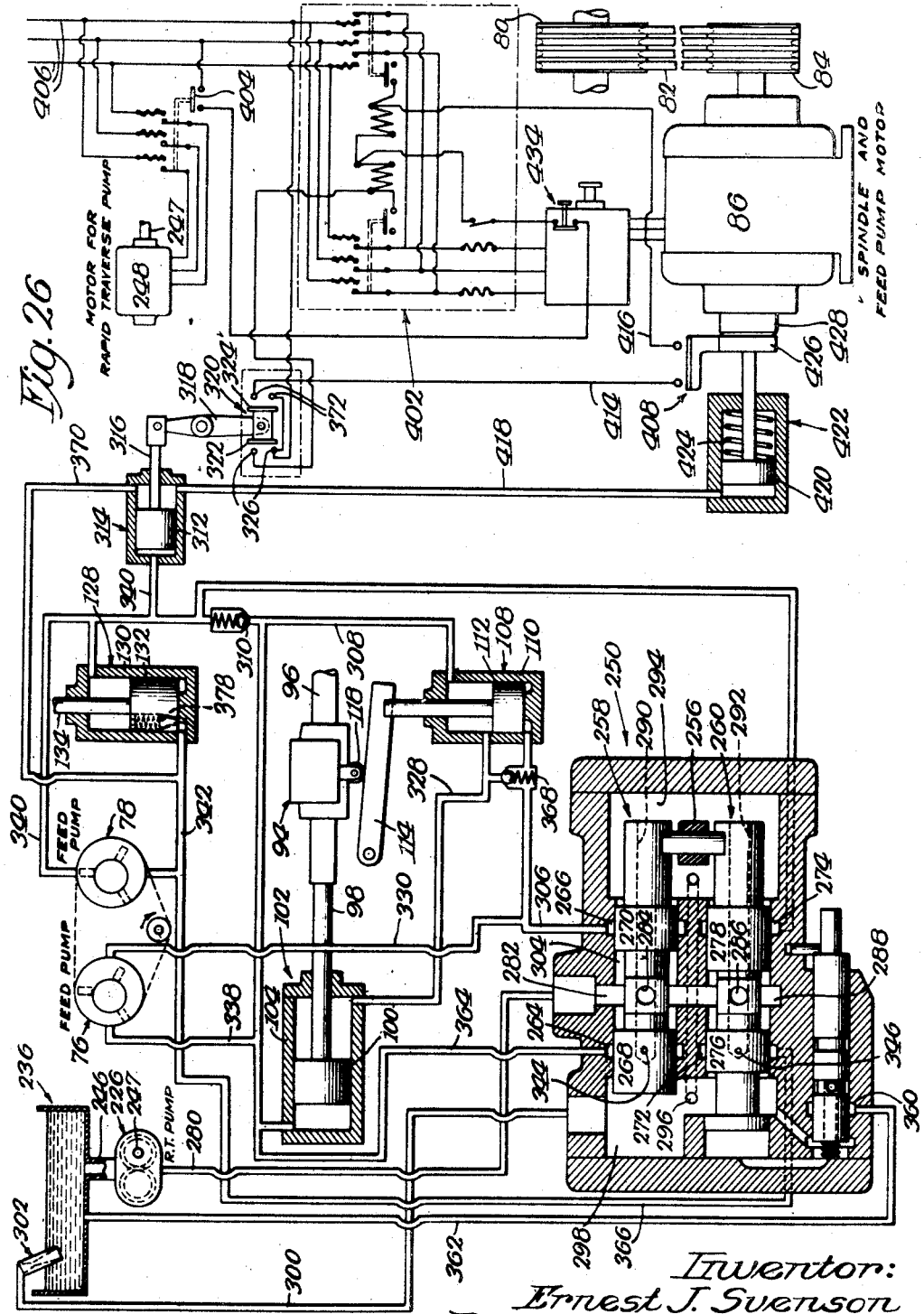

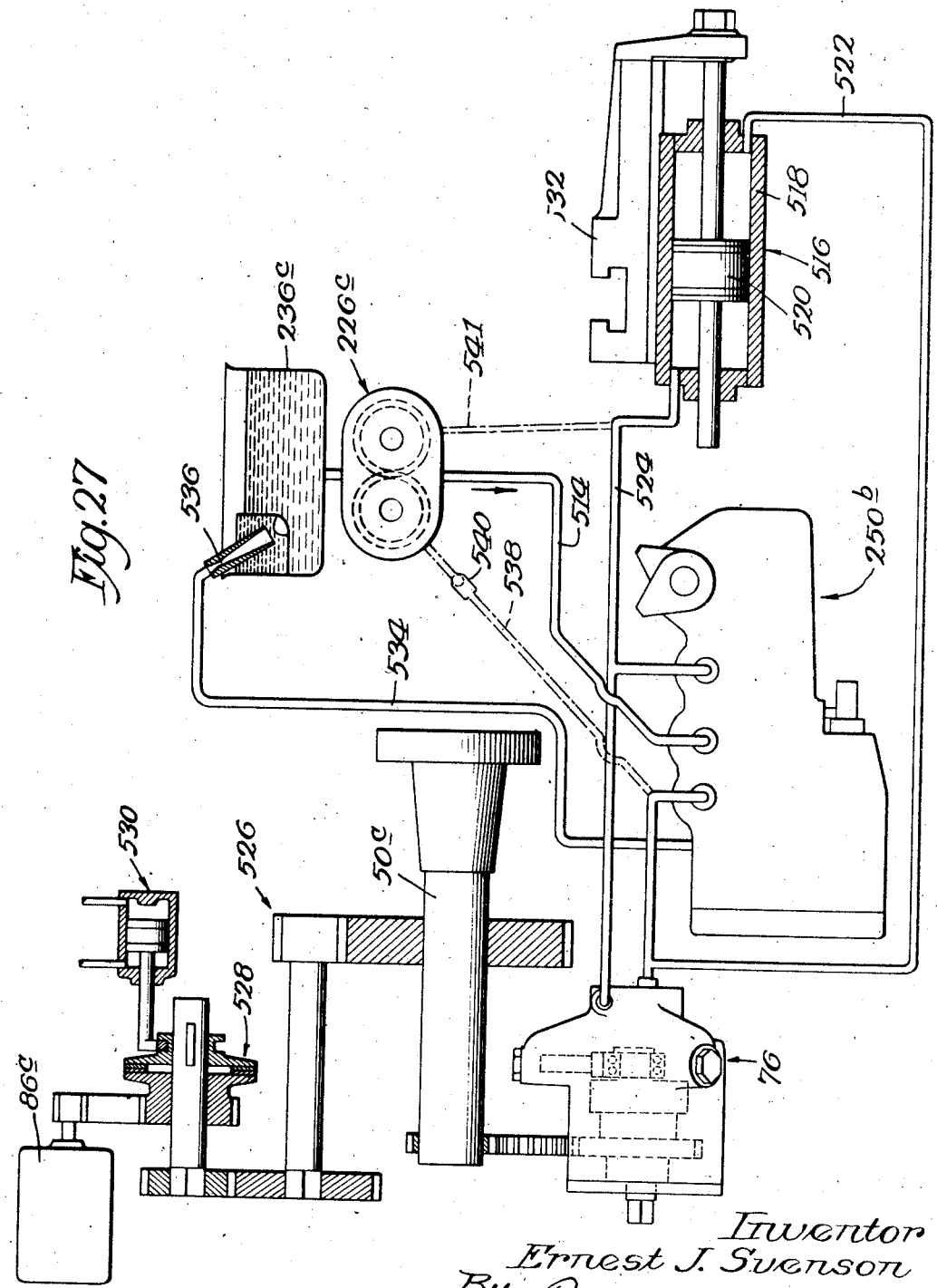

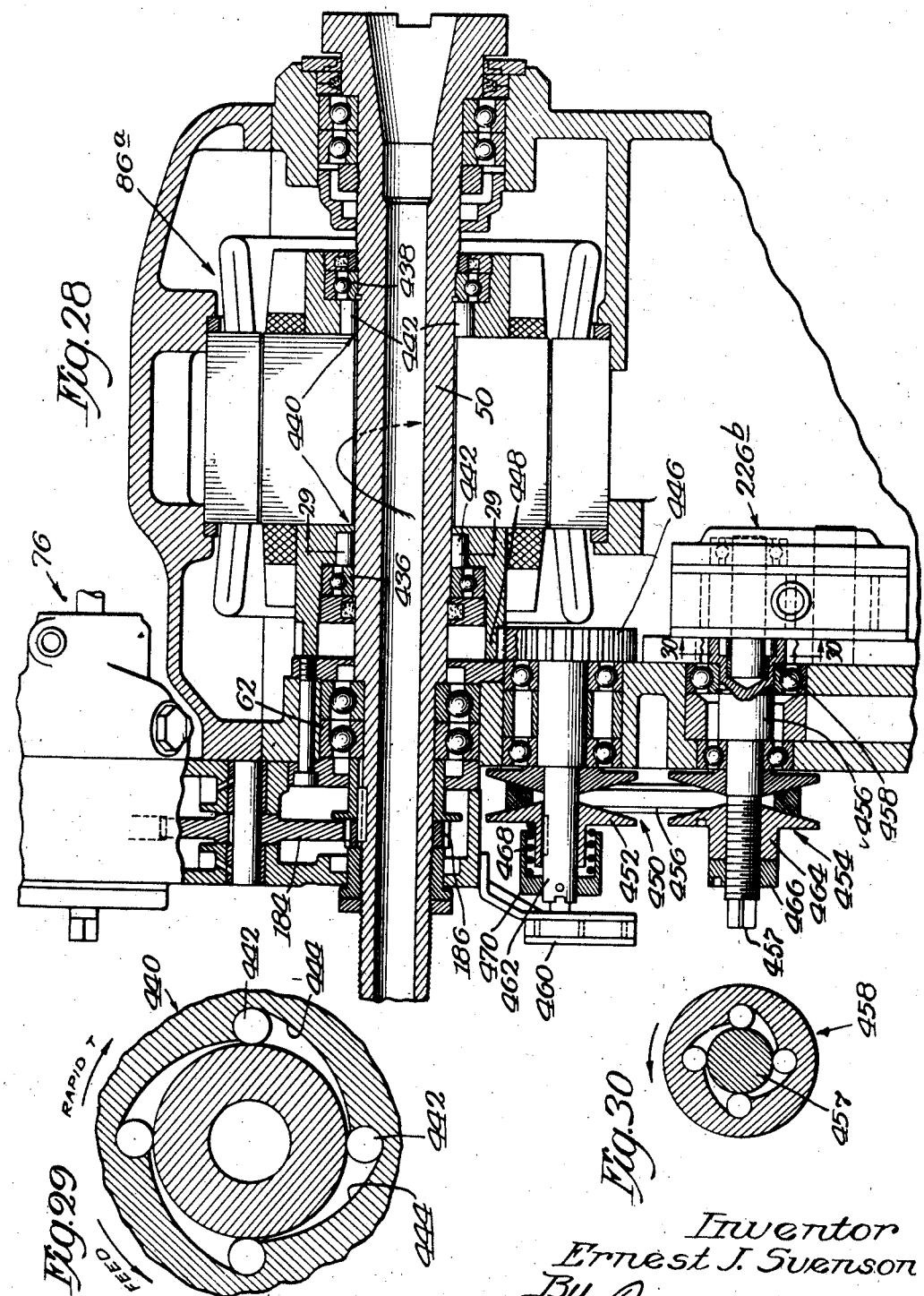

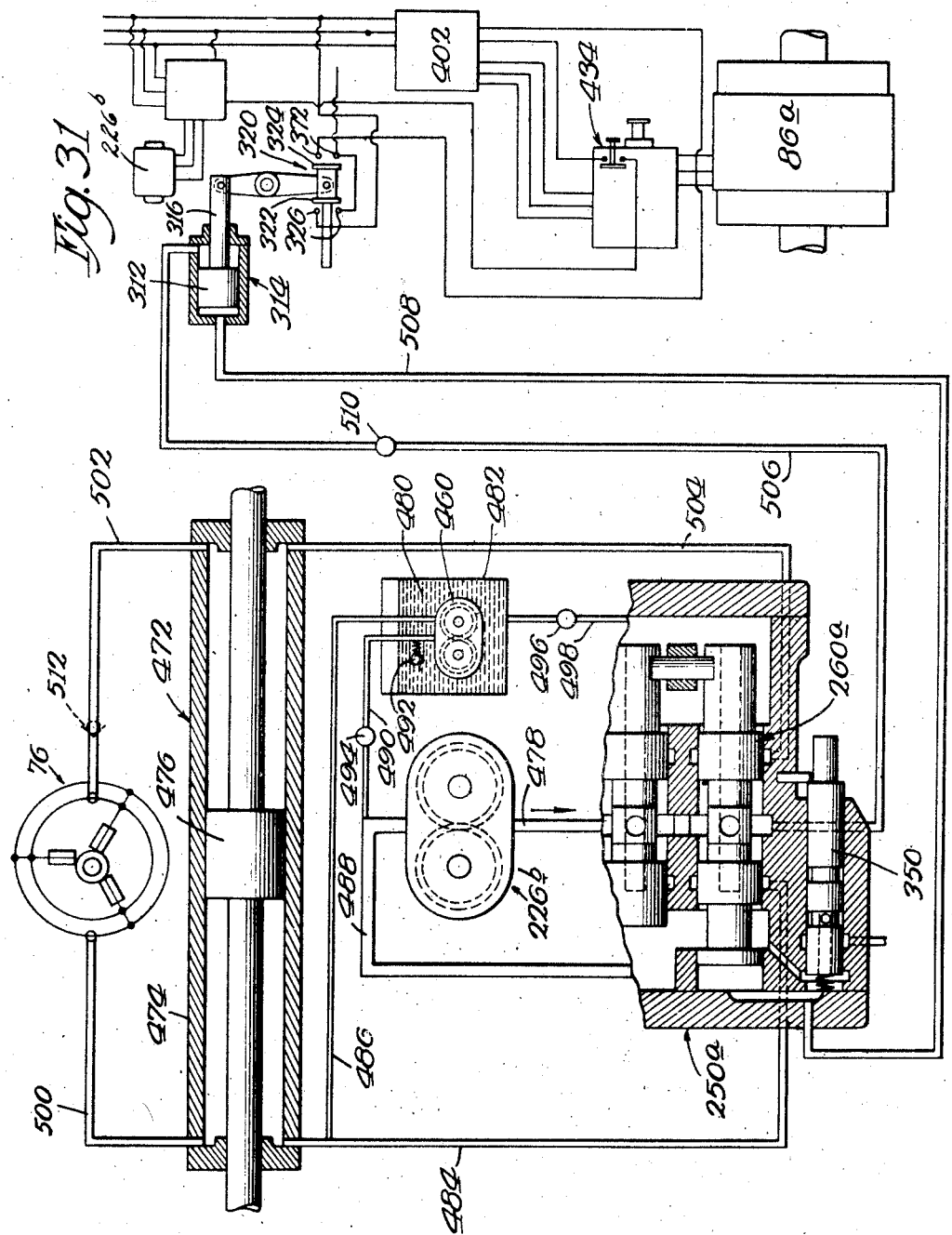

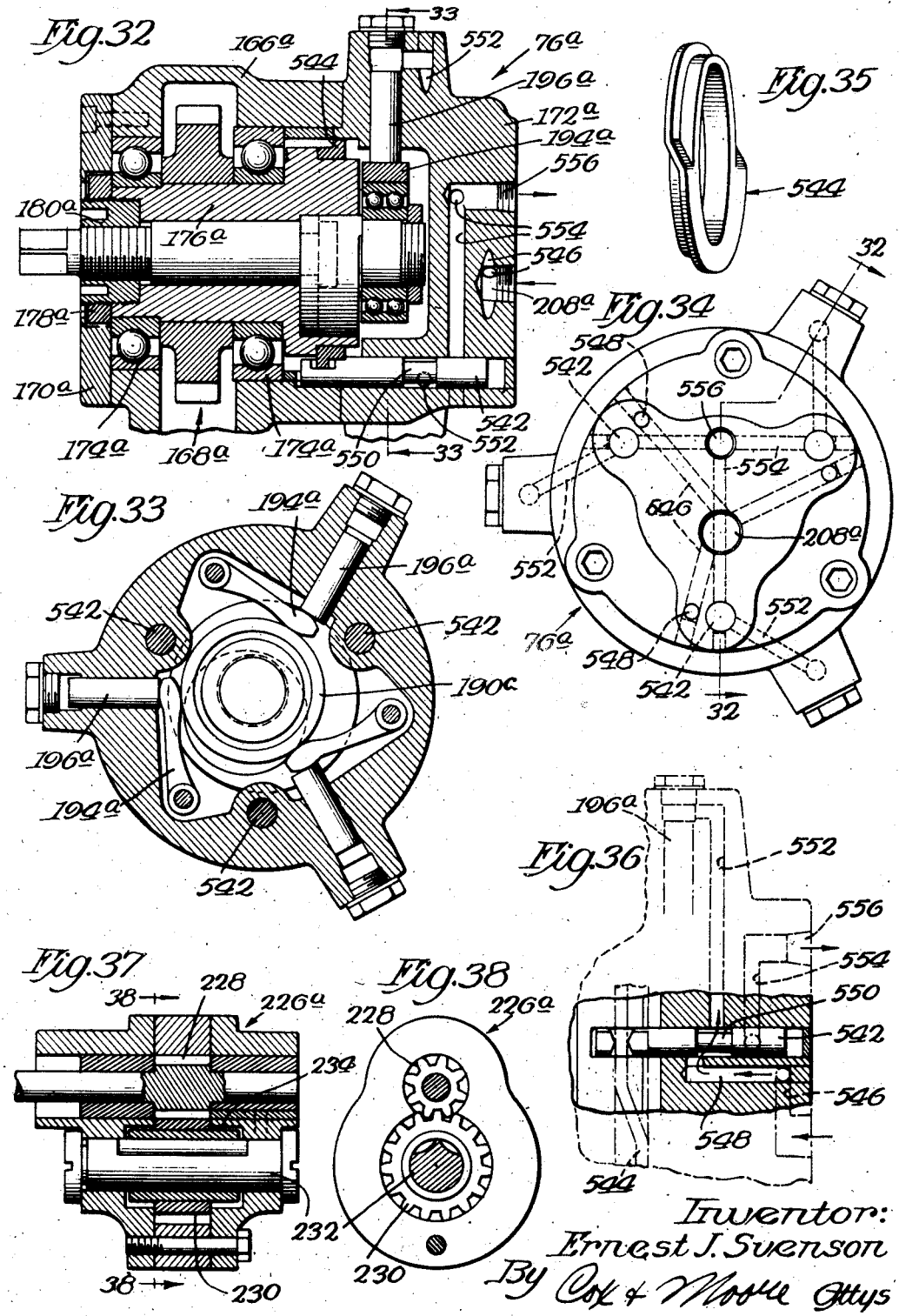

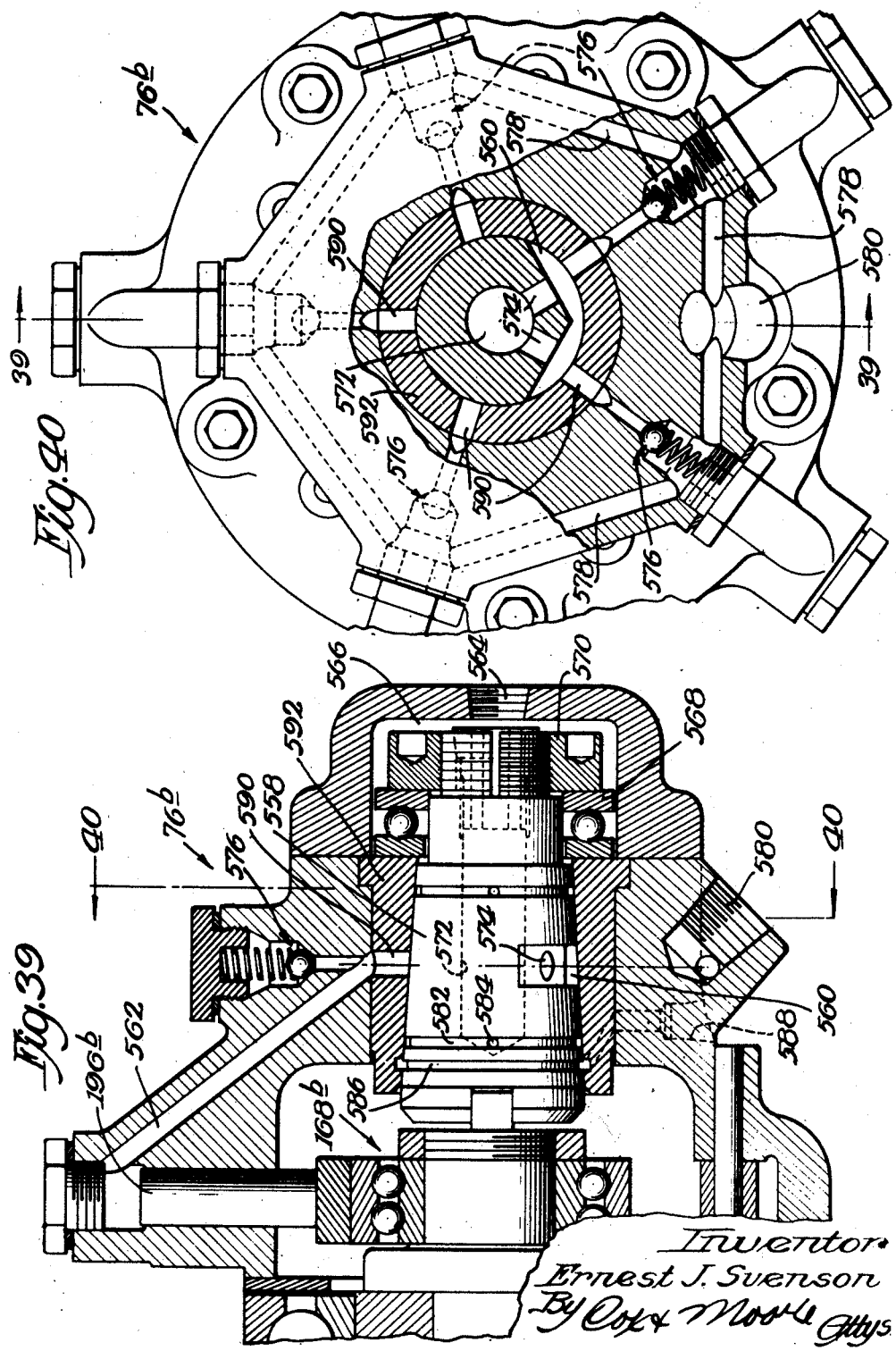

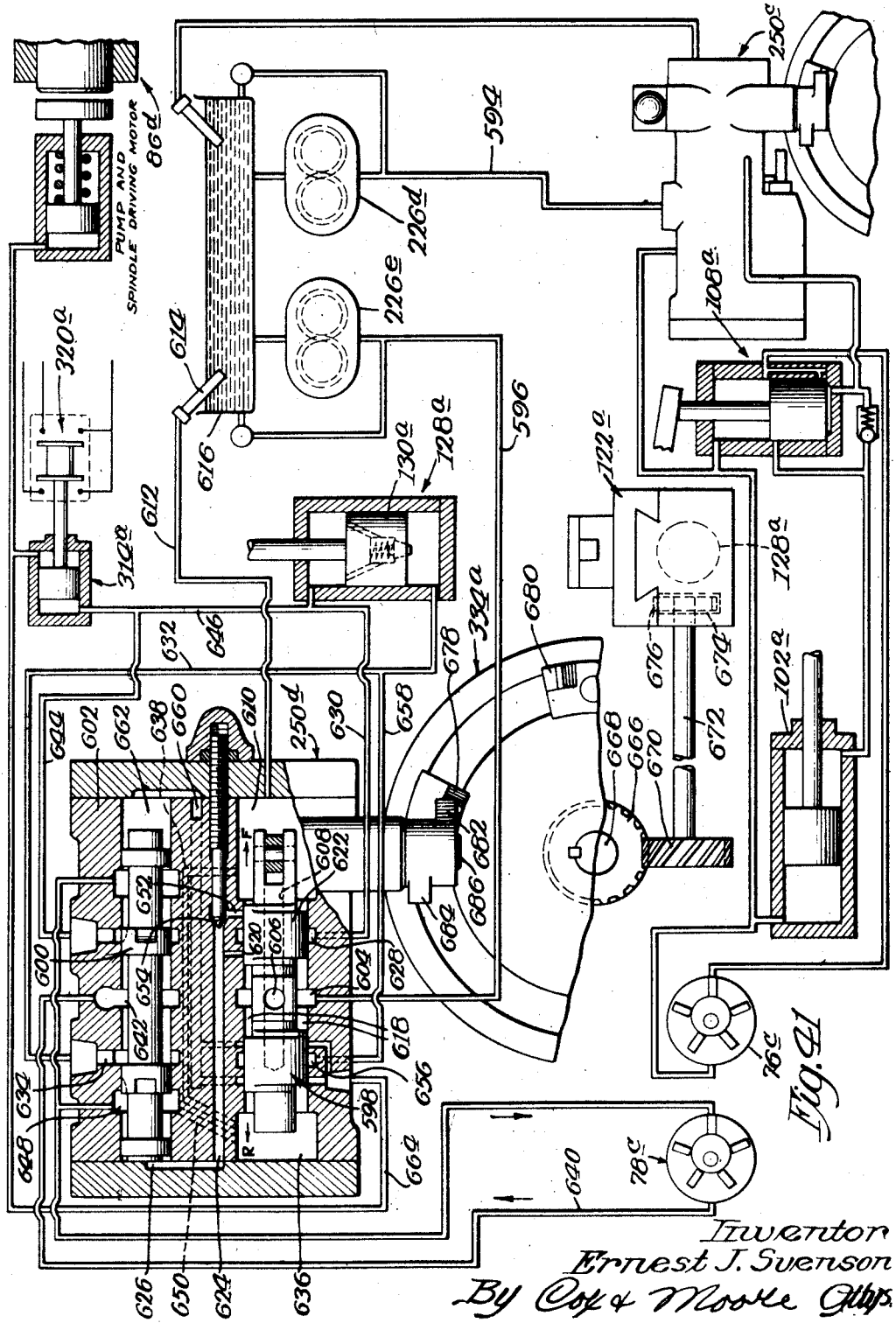

Patented Sept. 17, 1940

2,215,257

UNITED STATES PATENT OFFICE 2,215,257

MATERIAL WORKING APPARATUS AND CONTROL THEREFOR

Ernest J. Svenson, Rockford, Ill.

Application August 11, 1933, Serial No. 684,677

90 Claims. (Cl. 82—2)

My invention relates generally to material working apparatus and systems of control therefor, and more particularly to machine tools, such as automatic lathes and the like and to controls therefor.

In the design and development of material working apparatus, such as lathes, milling machines, boring machines, and other related machine tools, one is constantly confronted with the inherent physical limits of the parts or elements which make up the complete machine. That is to say, the elements which, in their combined form, present the complete machine are, as a result of their size, shape, location, mechanical design, etc., capable of performing work within definite predetermined limits. For example, a machine which is equipped with a transmission made up largely of a plurality of meshing gears, friction and other forms of clutches and associated elements, is limited in its speed of operation and load-carrying capacity due to the inherent structural arrangement and coordination of those transmission elements—for instance, if such a transmission is designed to effect the successive starting, stopping and reversal of a machine tool, the frequency with which these successive operations may be performed, as well as the speed of said operations, is governed by the inherent structural or physical limitations in the transmission design. Because of the above mentioned and numerous other physical limitations confronting machine designers, a real problem is presented in developing a machine, for example, an automatic lathe of relatively simple design and free from structural or mechanical bulk, which is equipped with automatic features demanded by the trade, such as feed and rapid traverse drives and the positive timed control thereof.

It is, therefore, one of the important objects of my present invention to provide a material working apparatus or machine tool, which, because of its structural arrangement, overcomes many of the physical limitations presented by the constituent parts of conventional machine tools with which I am familiar. In other words, I provide a machine, such as an automatic lathe of relatively simple, rigid, and durable construction, which has its work support and tools driven and controlled by mechanism which is free from many of the complicated, friction developing, expensive and bulky structural features heretofore employed in conventional types of machine tools with which I am familiar.

More specifically, my invention contemplates the provision of an improved novel and practical arrangement whereby the starting and stopping of a motor employed to drive the spindle of a machine tool may be effected at very frequent intervals; for example, several times a minute without the use of complicated controls and without subjecting the machine to deleterious vibrations and strains and without experiencing any appreciable wear over an extended period of time. I propose to utilize the electric current for breaking the motor when reversing the main mass of the motor, and this precludes the necessity of counteracting flywheel effect caused by conventional gear and clutch transmissions.

Still more specifically, my invention contemplates a starting and stopping arrangement, as mentioned above, wherein a prime mover, such as an electric motor, may be effectively employed to drive a tool spindle and a feed pump in combination with control mechanism for automatically and very quickly arresting rotation of the motor at a predetermined interval in the cycle of operation to permit the operative functioning of a rapid traverse mechanism.

A further object of the invention is to provide in combination with a reversible motor for propelling a machine tool spindle a novel and highly efficient hydraulic system of control therefor.

Still another object of my invention is to produce an improved machine frame, and more particularly to produce a machine frame, in which the tailstock and base are formed integral.

More specifically, it is an object of my invention to provide a combination of machine elements wherein said elements are shaped, located and cooperatively arranged in a manner so as to adapt said combination for use with a unitary frame construction.

Another object of my invention is to provide an improved electrical system of control in combination with a reversible motor, which control operates to effect the instantaneous stopping of a motor at a predetermined point of a cycle of operation.

A further object is to provide in combination with the mechanisms mentioned above safety devices which render the functioning of the machine foolproof and positively prevent injury to the machine operator.

A still further object is to provide in machines of the type mentioned above a free wheeling device, wherein a reversible motor may be employed which functions when rotating in one direction to propel a machine tool spindle, and in another direction to rotate free of the spindle and to cause a rapid traverse mechanism to function, thereby eliminating the necessity of employing more than one prime mover for feeding and rapid traverse driving mechanisms.

In addition to the above mentioned objects of the invention, I propose to provide a system of hydraulic control for machine tools and the like, wherein pumps of improved practical construction increase the operating effectiveness of a hydraulic actuator system which controls the functioning of the machine tool.

The foregoing and numerous other objects and advantages will be more apparent from the following detailed description when considered in connection with the accompanying drawings wherein—

Figure 1 is a front elevational view of an automatic lathe constructed in accordance with the teachings of my invention, the head stock thereof being shown in section in order to more clearly disclose the structural arrangement of the work supporting spindle;

Figure 2 is a rear view of the machine shown in Figure 1;

Figure 3 is a vertical transverse sectional view of the machine taken substantially along the line 3—3 of Figure 1;

Figure 4 is an enlarged detail sectional view of the hydraulic actuator for operating the main reverse control switch;

Figure 5 is a similar fragmentary sectional view taken substantially along the line 5—5 of Figure 4 to more clearly illustrate the manner in which the manually operable lever is connected with the reverse control switch mechanism;

Figure 6 is a horizontal transverse sectional view of the tailstock taken substantially along the line 6—6 of Figure 1;

Figure 7 is a vertical transverse sectional view of the tailstock taken substantially along the line 7—7 of Figure 6;

Figure 8 is an enlarged detail central sectional view of the reverse control switch and hydraulic mechanism therefor which is associated directly with the prime mover;

Figure 9 is a fragmentary transverse sectional view taken substantially along the line 9—9 of Figure 8;

Figure 10 is an enlarged fragmentary elevational view of the left end of the headstock with a portion of the transmission broken away to more clearly illustrate the driving connection between the machine spindle and the feed pump;

Figure 11 is an enlarged vertical fragmentary sectional view taken substantially along the line 11—11 of Figure 1, disclosing the control disk and valve mechanism associated therewith;

Figure 12 is a fragmentary horizontal sectional view taken substantially along the line 12—12 of Figure 13;

Figure 13 is an enlarged front elevational view of the dog carrying disk and main control valve associated therewith, said valve being shown in section in order to more clearly illustrate the parts otherwise hidden;

Figure 14 is a vertical transverse sectional view of the valve mechanism taken substantially along the line 14—14 of Figure 13;

Figure 19 is a vertical sectional view of a feed pump of the type adapted for use in the machine tool shown in the previous figures;

Figure 20 is a transverse sectional view of the pump taken substantially along the line 20—20 of Figure 19;

Figure 21 is an end view of the pump shown partly in section, said view being taken substantially along the line 21—21 of Figure 19;

Figure 22 is a fragmentary detail view of the eccentric driving mechanism for the feed pump shown in Figures 19 to 21, inclusive;

Figure 23 is a fragmentary transverse sectional view of the eccentric driving mechanism taken substantially along the line 23—23 of Figure 22;

Figure 24 is a detail sectional view of one of the ball valves disclosing the manner in which said valve serves to control communication between the inlet side of the feed pump and the pump passageways communicating with the plungers or pistons;

Figure 25 is a detail enlarged view of the ball valve of Figure 24 to more clearly illustrate the structural features thereof which render it particularly adaptable for use in closed circuits of the type contemplated by my invention;

Figure 26 is a diagrammatic view of the hydraulic and electrical control circuits for the machine disclosed in the previous figures;

Figure 27 is a circuit diagram to more clearly illustrate the manner in which the ball valve arrangement is peculiarly adaptable for closed circuit systems of control;

Figure 28 is a central sectional view of a modified spindle head construction equipped with my improved free wheeling drive, whereby to enable the motor mounted directly upon the spindle to serve as the source of propelling power for both the feeding and rapid traverse driving mechanisms;

Figure 29 is a fragmentary transverse sectional view taken substantially along the line 29—29 of Figure 28 to more clearly illustrate the position of the free wheeling clutch on the main spindle;

Figure 30 is likewise a fragmentary sectional view taken substantially along the line 30—30 of Figure 28 disclosing the free wheeling clutch arrangement associated with the rapid traverse pump;

Figure 31 is a diagrammatic view of a hydraulic actuator system of control, which is particularly adaptable for use with my improved free wheeling drive arrangement;

Figure 32 is a central transverse sectional view of a feed pump of modified construction adapted for use in machine tools of the type shown herein;

Figure 33 is a transverse sectional view of the pump taken substantially along the line 33—33 of Figure 32;

Figure 34 is an end elevational view of the feed pump as viewed from the right of Figure 32;

Figure 35 is a perspective view of the valve control cam employed in the feed pump shown in Figures 32 to 34, inclusive;

Figure 36 is a fragmentary sectional view of the control valve and associated parts to more clearly illustrate the functional characteristics of the control valve;

Figure 37 is a modified gear pump construction of the variable delivery type adapted to be used for propelling the machine tool parts at a rapid rate, said pump being also adapted, when desired, for feeding purposes;

Figure 38 is a transverse sectional view of the gear pump taken substantially along the line 38—38 of Figure 37;

Figure 39 is a fragmentary central transverse sectional view of a modified ball valve pump taken substantially along the line 39—39 of Figure 40;

Figure 40 is an end view taken from the right of Figure 39 along the line 40—40 of Figure 39; and Figure 41 is a circuit arrangement disclosing a modified rear and front carriage control.

Machine frame

Figure 15:
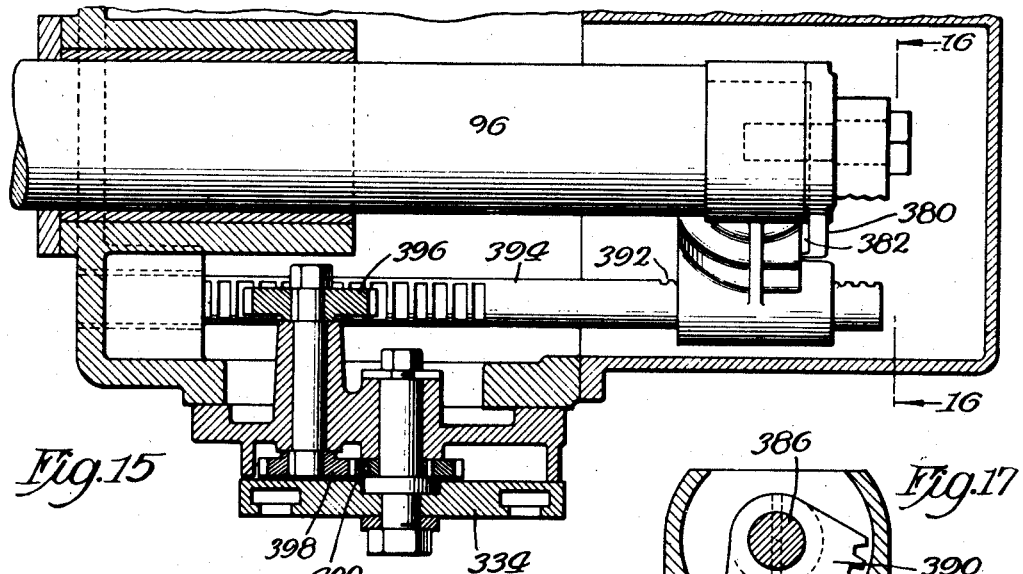
Figure 15 is an enlarged horizontal sectional view of the carriage supporting bar and driving mechanism which connects the bar and the dog supporting disk, said section being taken substantially along the line 15—15 of Figure 13.

Referring now to the drawings more in detail wherein like numerals have been employed to designate similar parts throughout the various figures, it will be seen that my invention contemplates the provision of a machine tool or lathe of the type more clearly shown in Figures 1 to 3, inclusive. This machine tool includes an integral frame or casting, which comprises a machine bed 40 extending upwardly from a base 42. The frame also includes a headstock section 44 and a tailstock section 46, both of which are formed integral with the bed 40. This unique integral casting greatly contributes to the efficiency of the machine, as will later more clearly appear.

Headstock

The headstock of the lathe which I have designated generally by the numeral 48, Figure 1, includes a main machine spindle 50, which is configurated at its inner extremity 52 to receive a work holding chuck or other suitable device. One extremity of the spindle 50 is mounted in suitable anti-friction preloaded bearings 54, which are held in position by a suitable tightening nut 56, all of said parts being completely sealed within a chamber by sealing rings 58 and 60. The opposite end of the spindle 50 is likewise supported in anti-friction preloaded bearings 62, which bearings are, in turn, mounted within a cuplike support 64 carried in the headstock section 44. The bearings 62 are clamped in position by means of a ring 66, and are sealed within the confines of the member 64 by suitable sealing members 68 and 70, Figure 1. A flanged member or disk 72 carried by the spindle revolves within a chamber 74 supplied with oil, and thereby lubricates the driving mechanism interposed between feed pumps 76 and 78.

Spindle drive

The spindle 50 carries a pulley 80, which is driven through the agency of a flexible coupling or belt 82 from a companion pulley 84 mounted on the shaft of a reversible electric motor designated generally by the numeral 86, Figures 1 and 3. This motor is mounted upon a base 88 pivotally supported at 90. To adjust the position of the pulley to take care of variations in the reach of the belt, it is only necessary to adjust a screw 92, which is conveniently located at the front side of the machine.

Front tool carriage

A front tool carriage designated generally by the numeral 94 is clamped to an oscillatory and longitudinally shiftable bar or shaft 96, which shaft is mounted at opposite extremities within the head and tailstock frames, respectively. One end of the bar 96 (to the left, Figure 1) connects with a piston rod 98, and this rod is connected with the piston 100 of a hydraulic actuator designated generally by the numeral 102. The actuator includes a suitable cylinder 104 which houses the actuator piston 100. Through the agency of the actuator 102 longitudinal movement of the bar 96, and consequently movement of the front tool carries 94 axially of the spindle 50, is accomplished. The hydraulic control mechanism, of which the hydraulic actuator 102 forms a part, is later to be described. A tool 106 supported by the front carriage 94 is adapted to be swung toward a supported work piece (not shown) about the axis of the bar 96 through the agency of a hydraulic actuator designated generally by the numeral 108, Figures 1 and 3. This actuator 108 includes a cylinder 110 and a vertically reciprocable piston 112, the upper piston rod portion of which supports the underside of a tiltable actuating and guide bar 114. This bar 114 is adapted to be pivoted at various points along a member 116 provided at the front side of the machine bed, Figure 1. The underside of the carriage 94 is provided with a roller 118, which rests upon and rolls along the upper edge of the bar 114. During the portion of cycle of operation of the machine, the bar 114 is elevated in response to the hydraulic actuator 108, thereby carrying the tool 106 into operative association with the work piece. When the bar reaches the upper limit of its movement, it engages an abutment or stop 120, Figure 1. It will be noted that the abutment or stop 120 makes a floating connection with the machine frame. In other words, the abutment takes up all of the strain resulting from the engagement therewith by the free end of the member 114 so that no deleterious strains or stresses are transmitted to the frame. By this arrangement the abutment always occupies a preselected position irrespective of the pressure transmitted by the actuator 108. After the carriage 94 has been shifted inwardly so as to properly position the tool 106, the actuator 102 functions to move the carriage longitudinally of the work in a manner later to be described.

Rear tool carriage

A rear tool carriage designated generally by the numeral 122 (Figures 2 and 3) includes a carriage proper or slide 124, upon which is mounted a cutting tool 126. Movement of the carriage 122 toward and from the work is occasioned in response to a hydraulic actuator 128, which includes a cylinder 130 and a piston 132, which is connected by means of a rod 134 to a depending section of the slide 124, Figure 3. The cylinder 130 is mounted in any suitable manner upon the bed 40. It will suffice at this point of the description to state that my machine is so arranged that the movement of the actuator piston 132 takes place simultaneously with and in response to the upward movement of the actuator piston 112. The cylinders 110 and 130 are connected in series to effect this movement, and in this manner a coordinated timed functioning of the actuators 108 and 128 is accomplished.

Tailstock

Attention is directed to the novel and practical construction of the tailstock, which I have designated generally by the numeral 136 (Figures 1 and 6). This includes a sleeve 138, which is adapted to be longitudinally adjusted within the tailstock frame 46 by manually adjusting the handle 140, which connects with a pinion 142. This pinion 142 meshes with teeth formed integral with the sleeve 138, as clearly shown in Figure 6. The sleeve 138 is adapted to be secured within the frame 46 by means of suitable clamping screws 144 after said sleeve has been shifted to a final position of adjustment by manual manipulation of the handle 140. A second sleeve 146 is mounted and longitudinally adjustable within the sleeve 138. The adjustment of the sleeve 146 is accomplished by means of a screw 148. A center 150 is carried by a member 152, which is rotatably mounted within preloaded anti-friction bearings 154. Said bearings are secured in position by means of a clamping ring 156. Said clamping ring 156 may be secured to the sleeve 146 by any suitable means not shown, such as screws or the like. The inner end of the center supporting member 152 is reduced in diameter and mounted within anti-friction preloaded bearings 158, said bearings being secured against longitudinal displacement by a clamping ring 160. The inner end of the member 152 makes a point contact with the peripheral surface of a ball 162, which is housed within a hardened screw member 164. This makes a very practical and durable tailstock construction, which will stand the severest loads without experiencing the slightest degree of lateral distortion. The tailstock effectively cooperates with the spindle 50 in maintaining absolute alinement of a supported work piece.

It will be noted also that the handle 140 is so arranged that when it is swung to the position shown in Figure 7, it will release the frame 46 from the sleeve 138. This enables the handle to be moved freely for the purpose of shifting the sleeve 138. However, when said handle is swung about its pivot, a clamping surface 141 will engage the upper surface of a washer resting on the frame 46, and thereby securely clamp the sleeve 138 in place. In this manner the single handle serves both as a means for longitudinally shifting the sleeve and as a means for securing said sleeve against longitudinal displacement.

*Feed pump*

The feed pumps 76 and 78 are identical in construction, and therefore a description of one of the pumps will suffice for the other. The pump 76 is shown in detail in Figures 19 to 25, inclusive, and is also shown in elevation in Figure 1, as well as diagrammatically in Figure 26. This pump includes a central housing 166, which carries the pump driving mechanism 168, an end plate 170, and an oppositely disposed housing 172 serving as an enclosure and support for the plunger and valve elements of the pump. Preloaded anti-friction bearings 174 provided within the housing 166 serve as the support for a rotary driving member or sleeve 176. Longitudinal displacement of the sleeve 176 to the right is prevented by a clamping ring 178 and an adjusting screw 180, while longitudinal displacement to the left (Figure 19) is prevented by reason of a flange 181, which engages the right bearing 174.

This sleeve 176 carries a driving gear 182, which meshes with and is driven from a gear 184 (Figures 1 and 10), which, in turn, meshes with a gear 186 carried by the spindle 50. A driving member 188 mounted within and rotatably adjustable with respect to the driving sleeve 176 serves as the means for adjusting the eccentricity of a driving ring 190. This ring 190 is supported by anti-friction bearings mounted upon an eccentrically adjustable stub shaft 192. When it is desired to vary the eccentricity of the ring 190 with respect to the axis of the sleeve 176, it is only necessary to rotate the member 188 by gripping it at its outer squared end.

A plurality of fingers 194 are uniformly spaced about the axis of the sleeve 176, and are pivotally supported within the end frame or casing 172, as clearly indicated in Figure 20. The free extremities of these fingers are interposed between the driving ring 190 and companion pump pistons or plungers 196. The curvature of the fingers is such as to impart uniform acceleration and deceleration, or, in other words, simple harmonic movement to the pistons 196. Fluid is directed toward and away from the outer ends of the pistons 196 in companion passageways 198, Figures 19 and 21. Each of these passageways 198 communicates with a pair of valves, namely, an intake control valve 200 and an outlet control valve 202.

Fluid is directed to the valves 200 from an intake conduit 204, Figure 21, which constantly communicates through a transverse passage 206 with an annular passage or port 208. This annular passage 208 directs fluid to the intake valves 200 through a passage 210, which is companion to each valve. Said valves include a ball valve member 212. I prefer to employ ball valves comprised of Swedish steel, which has been specially treated to obtain an unusually hard and tough structure. The balls 212 are normally urged by means of a coil spring 214 interposed between said balls and a threaded plug 216 into engagement with a valve seat 218. Referring to Figure 25 wherein I have disclosed an enlarged view of the ball and seat therefor, it will be seen that the seat 218 is shaped to conform with a portion of the spherical surface of the ball valve.

The ball 212 is provided with an annular recess 213 designed to receive the adjacent portion of the coiled spring 214 (Figure 25). The portion of the coiled spring 214, which is received by the annular recess 213, is formed with converging walls which are adapted to abut the companion walls or surfaces of the recess. This arrangement positively prevents the ball from being dislodged and maintains the same surface of the ball in contact with the valve seat 218.

Attention is also directed to the fact that the annular area 220 presented between the outer periphery of the ball 212 and the inner periphery of the valve chamber 222 is less than the cross-sectional area presented by the intake passageway 210. The significance of this construction will be more apparent when the hydraulic system is described in connection with the pump. From the foregoing, it will be apparent that fluid from the conduit or pipeline 204 may pass through the valve 200 and into the passageway 198 companion thereto. The intake of the fluid occurs during the inward stroke of the pistons 196. During the compression stroke of the pistons fluid passes from the passageways 198 and into a passageway 210a; which communicates with the discharge valve 202. It will be noted that the spring for the ball valve 212a is more powerful than the spring for the intake ball whereby to preclude the opening of the ball valve 212a when the pistons are being charged. In other words, the ball valve 212a will only open when the piston companion thereto is experiencing its compression stroke, and said ball valve will not open during any other portion of the cycle irrespective of pressure conditions in the propelling side of the circuit. This valve is identical in structural characteristics with the valve 200 previously described. The valve 202 includes a ball valve 212a, a coil spring 214a, a chamber 222a, and a threaded plug 216a. Fluid passing through the valve 202 enters a discharge conduit or pipe line 224.

The pump just described is designed to deliver fluid to a hydraulic actuator at a feeding rate. The rate of displacement of the pump can be varied by merely adjusting the eccentricity of the driving ring 190, and thereby affecting the stroke of the pistons 196.

Rapid traverse pump

The hydraulic actuators 104, 108, and 128 are adapted to be actuated at a rapid traverse rate by means of a large displacement, relatively low pressure pump 226 (Figures 2 and 26). This pump is similar to the variable delivery gear pump shown in my Patent No. 1,912,737. This patent discloses a gear pump which is particularly adaptable for machine tool work, because its construction is such as to reduce fluid heating to a minimum. In Figures 37 and 38 I have disclosed a modified gear pump construction 226a. This pump includes a pair of gears 228 and 230 within a suitable housing. A valve member 232 is positioned within and forms a support for the gear 230, and is adapted to receive fluid from passages 234. The gear 228 may be longitudinally shifted so as to vary the fluid delivery of the pump.

Fluid is directed to the rapid traverse or gear pump 226 from a reservoir 236, which is provided within the headstock frame 44. This reservoir comprises an intake chamber 238 (Figure 2) wherein fluid is delivered from a return conduit 240. The return fluid engages the diverging surfaces 242 within the chamber 238, said surfaces serving to effect the gentle, nonturbulent entry of fluid. Fluid from the chamber 238 overflows into the main reservoir chamber 244, and is directed from this chamber through a relatively large conduit or pipe 246 to the intake side of the rapid traverse pump 226. The pump 226 (as shown in Figure 2) is driven from a coupling shaft 247, which connects with an electric motor or prime mover 248. However, as will later appear, other forms of driving mechanisms may be employed for propelling the rapid traverse pump without departing from the spirit and scope of my invention.

Hydraulic control

The functioning of the hydraulic actuators 102, 108 and 128 is controlled through the agency of a main control valve, which I have designated generally by the numeral 250, Figures 1, 11 to 14, inclusive, and Figure 26. This valve mechanism 250 is mounted on the front side and to the right (Figure 1) of the machine bed 40, and may be controlled by manual manipulation of a control lever or handle 252. This handle 252 operates a vertically disposed shaft 254 (Figure 11), which is connected by means of a lever 256 with one extremity of a pair of valve members 258 and 260. These valve members are longitudinally shiftable within a valve casing 262, and are capable of being shifted to three different positions. In Figures 13 and 26 said valve members are shown in their neutral position, at which time ports 264 and 266 are blocked by valve sections 268 and 270, respectively, of the valve member 258, and ports 272 and 274 are likewise blocked, respectively, by sections 276 and 278 of the valve member 260. Assume that the valve members 258 and 260 occupy the above mentioned neutral position, and that the prime mover or motor 248 is driving the rapid traverse pump 226. Assume further that the front tool carriage 94 occupies the lowered position shown in Figures 1 and 3, and that said carriage also is positioned at the right extremity of a work piece supported between the spindle 50 and the tailstock center 150. Also assume that the rear tool carriage 122 occupies the position shown in Figure 3, and that the motor 86 is not functioning.

Under these circumstances fluid from the reservoir 236 passes through the conduit or duct 246 into the pump 226. From the pump 226 the fluid passes through the conduit 280, and thence into a port 282 of the valve mechanism 250. A radial valve passage or port 284 in the valve member 258, as well as a similar radial passage or port 286 in the valve member 260 is now in communication with the valve port 282 through the agency of an enlarged passage or channel 288 (see Figures 11, 13, and 26). The fluid passes from the radial passages 284 and 286 into companion longitudinal passages 290 and 292, respectively, which communicate with an end chamber 294 of the valve housing. This chamber 294, through a longitudinal passage 296 communicates with a chamber 298 at the opposite end of the valve housing, and this chamber 298 communicates with a return conduit or pipe line 300, which serves to direct fluid back to the reservoir 236 through a restricted orifice mechanism 302. By returning the fluid through the restricted orifice 302, a required amount of pressure is maintained within the system. From the foregoing description it will be apparent that when the valve members 258 and 260 occupy their central or neutral positions, fluid merely circulates back to the reservoir through the restricted orifice 302.

Assume that the operator manipulates the control handle 252 so as to urge the valve members 258 and 260 to the right from the position shown in Figures 13 and 26. This position of the valve will hereinafter be referred to as the rapid approach position, and in this position the valve uncovers the port 266 so as to permit fluid from the gear pump to pass through side passages 304 in the valve member 258, and thence through said port 266 into a conduit or pipe line 306. It will be noted that the section 278 in the valve member 260 is longer than the section 270 of the valve member 258, and hence does not uncover the valve port 274 when said valve members are shifted to the right (Figures 3 and 26). Fluid from the pipe line 306 enters the lower portion of the hydraulic actuator 108, thereby causing the piston 112 to shift upwardly so as to cause the tool 106 on the front carriage to shift toward the supported work piece. Fluid at the advancing side of the piston 112 is moved into a conduit 308, and thence through a check valve 310 into the rear portion of the actuator 128. Thus, the movement of the rear tool carriage 122 takes place simultaneously with and in response to the upward movement of the actuator piston 112. The forward movement of the carriage 122 causes the tool 126 to be shifted into operative association with the supported work piece. Simultaneously with the advancement of the tool carriages 94 and 122, the piston 312 of an actuator 314, which will hereinafter be designated as the main reverse control actuator, is shifted to the right (Figure 26). The piston rod 316 of piston 312 connects with a shifting member 318, which operates a switch 320. The switch 320 includes contact elements 322 and 324. Thus, upon the movement of the piston 312 to the right, the switch contact element 322 engages companion contacts 326. This closes an electrical circuit, including the electric motor 86 in a manner later to be described, and thereby causes said motor to drive said spindle 50 in the direction indicated by the arrows in Figures 1 and 3, and also to cause the actuation of the feed pumps 76 and 78.

When the actuator piston 112 reaches the limit of its upward movement, the rear carriage 122 will have reached the point where the tool 126 is ready to make a cut in the work piece, and the tool 106 will have reached a position to start a turning cut on the work piece. Obviously by proper timing, the cutting action of the rear tool may take place at any selected interval of the cycle. In other words, the invention is not limited to any particular interval of operation of the rear tool. At this instant the piston 112 establishes communication between a pipe line or conduit 328 and the conduit 306 through the actuator cylinder 110, Figure 26, thereby causing high pressure fluid passing through a conduit 330 connected with the discharge side of the pump 76 to be directed to the right end (Figure 26) of the actuator 102.

At this point it should be understood that at the instant the front and rear tool carriages reach the limit of their rapid approach movement, a dog 332 mounted on a control disk 334 (Figure 13) engages a finger 336 secured to the lower extremity of the valve shaft 254. This causes the valve members 258 and 260 to be automatically shifted back to the neutral position shown in Figure 13, thereby cutting off the supply to the actuators 102, 108, and 128, of low pressure fluid from the rapid traverse pump 226. The mechanism which propels the control disk 334 in timed relation with the movement of the tool carriages will be presently described.

As previously stated, high pressure fluid is now directed from the pipe line 328 to the right end of the actuator 102 (Figure 26) so as to cause the oscillatory bar 96 to move the front tool carriage 94 at a feeding rate to the left. Fluid from the advancing side of the actuator piston 100 passes outwardly through a conduit or pipe line 338, and thence to the intake side of the feed pump 76. In this manner the actuator 104 is connected in a closed circuit with the feed pump 76, and a predetermined timed relation is maintained between the rotation of the spindle and the translation of the front tool carriage.

During the feeding stroke or movement of the front tool carriage, the rear tool carriage also experiences a feeding movement, inasmuch as high pressure fluid from the feed pump 78 passes through a conduit or pipe line 340 and into the rear side of the actuator 128. Fluid from the advancing side of the actuator piston 132 is returned to the intake side of the pump 78 through a pipe line 342. In this manner the hydraulic actuator 128 is connected in a closed circuit with the feed pump 78. It will be noted that the closed circuits, which have just been described, are such that the fluid from the advancing side of the pistons is volumetrically sufficient to charge the feed pumps. To account for any slight variation in volumetric displacement, as a result of the presence of the piston rods 98 and 134 on one side of their respective pistons 100 and 132, I provide vents or bleed passages 344 and 346. These passages are so small as not to disturb the closed circuit condition within the circuits, which include the feed pumps 76 and 78, and yet are large enough to permit the slow migration of a small quantity of fluid through the valves 258 and 260 during the forward feeding movement of the pistons 100 and 132.

When the front tool carriage reaches the limit of its forward feeding movement, a dog 348 carried by the control disk 334 (Figure 13) engages the reduced outer extremity of a valve member 350, and shifts said member to the left against the action of a coil spring 352. This establishes communication between a chamber 354 at the left end of the valve member 260 (Figures 13 and 26), and the reservoir 236 through a longitudinal passage 356 and radial passage 358 in the valve member 350, a valve port 360 and a return conduit or pipe line 362. The pressure of fluid at the right end of the valve 260 is sufficient to cause the sudden shifting of the valve members 258 and 260 to the left of the neutral position shown in Figures 13 and 26. This left position of the valve will be hereinafter referred to as the rapid reverse position. In this position the valve member 258 permits fluid from the rapid traverse pump 226 to be delivered through a conduit 364 into the left end of the actuator 102, and the valve member 260 permits the flow of low pressure fluid into a conduit 366, and thence through the conduit 342 into the forward end of the hydraulic actuator 128, whereby to effect rapid reverse movement of the pistons 100 and 132. Fluid from the advancing side of the piston 100 passes through the pipe line 328, which when the actuator piston 112 occupies its lowermost position, communicates with the conduit 306 through a check valve 368. At this point it should be understood that the instant that the high pressure is removed from the lower end of the cylinder 112, the front tool carriage 94 shifts said cylinder downwardly to its initial starting position, as shown in Figure 26.

Attention is also directed to the fact that at the instant the valve members 258 and 260 are shifted to their rapid reverse position, the pressure of the fluid in the pipe line 342 is transmitted through a conduit or pipe line 370 into the right end of the reverse control actuator 314. This causes contact between the elements 322 and 326 to be broken, and contact established between the element 324 and contacts 372. This conditions the circuit, including the motor 86, to effect reverse movement of the motor, and thereby causes an instantaneous stopping of the motor. The mechanism for causing the instantaneous stopping of the motor 86 at the time the rapid reverse movement is imparted to the tool carriages, will presently be described. It will suffice at this point to state that during the rapid reverse movement of the front and rear tool carriages, the machine spindle 50 is stationary.

When the carriages reach their initial or starting positions, a dog 374 on the control disk 334 engages a finger 376, which causes the valve members 258 and 260 to be shifted to their neutral position. The work piece may now be replaced, and the cycle of operation just described repeated by manually shifting the control lever 252 so as to move the valve members 258 and 260 to their rapid forward or approach position. It will be noted that in the piston 132 I provide a plunger valve 378 which is adapted, when the piston 132 reaches the limit of its advancing stroke, to engage the forward wall of the cylinder 130, and in this manner establish communication between the opposite sides of the piston 132. Thus, in the event that the forward stroke of the rear tool carriage is completed before the feeding stroke of the front carriage, said rear carriage may remain in its advance position without setting up any undue pressure at the controlling side of the piston 132 as the piston 100 continues to complete its advancing movement.

*Control disk driving mechanism*

Figure 17:
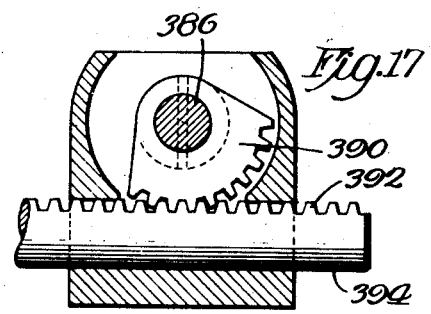
Figure 17 is a fragmentary transverse sectional view taken substantially along the line 17—17 of Figure 16.
Figure 16:
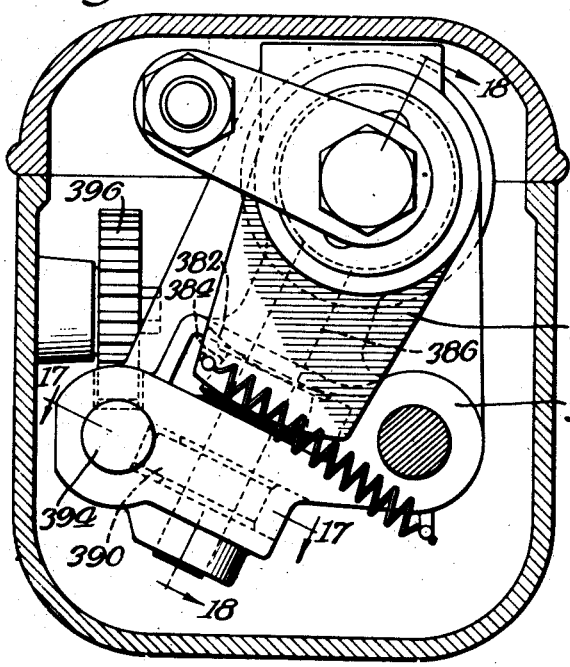
Figure 16 is a vertical transverse sectional view taken substantially along the line 16—16 of Figure 15, disclosing an end elevation of the mechanism providing the connection between the oscillatory bar and the dog supporting control disk.
Figure 18:
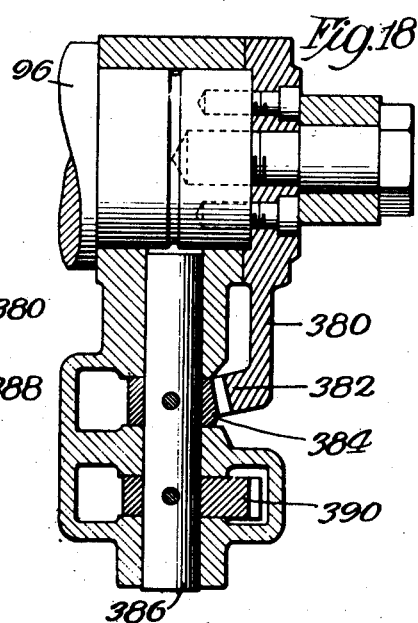
Figure 18 is a sectional view taken substantially along the line 18—18 of Figure 16.

The disk 334 is rotated in response to the movement of the front tool carriage. Referring to Figures 1 and 15 to 18, inclusive, it will be seen that the bar 96 at the right extremity thereof supports a member 380, which is adapted to oscillate with the bar. The teeth 382 provided along the inner side of the member 380 mesh with companion teeth in a bevel gear segment 384. This segment 384 drives a shaft 386, which is mounted within a bracket 388. This bracket 388 is likewise carried by the bar 96, but is not designed to oscillate with the bar. In fact, the bracket 388 is adapted to move as a unit with the bar as said bar is shifted longitudinally, but does not oscillate with the bar. Rotation of the bevel gear segment 384 causes rotation of a gear segment 390 (Figures 16 and 17) which meshes with companion rack teeth 392 in a rack bar 394 extending parallel with and spaced from the oscillatory bar 96. Assuming that the bar 96 is not moving longitudinally but is oscillating so as to shift the member 380, it will be apparent that longitudinal movement will be transmitted to the rack bar 394. The movement of the rack bar 394 causes rotation of a gear 396, and this gear 396 acts through a pair of gears 398 and 400, which drive the control disk 334. From the foregoing it should be apparent that the oscillation of the bar 96 resulting from the movement of the front tool carriage 94 serves to impart rotation to the disk 334. Thus, if it is required to control the functioning of the valve mechanism 250 during the swinging of the front tool carriage, this can be effected by properly positioning dogs upon the control disk 334 also rotates in response to the longitudinal travel of the bar 96. As the bar 96 moves longitudinally, the bracket 388 moves therewith as a unit, and this bracket being operatively coupled with a rack bar 394 through the segment 390 just described causes said rack bar to move longitudinally in the same direction as the bar 96. In this manner rotation of the control disk 334 is effected by the longitudinal travel of the bar 96. From the foregoing it will be understood that my control mechanism is so designed as to effect automatic control of the hydraulic actuators without the necessity of imparting longitudinal movement to the front tool carriage.

*Automatic plugging switch control*

Thus far I have described the manner in which my improved hydraulic system of control functions to automatically govern the movement of the tool carriages. I shall now describe the manner in which the prime mover or electric motor 86 is controlled in timed relation with the feeding and rapid traverse movements of the tool carriages. Referring particularly to the circuit diagram shown in Figure 26 and the disclosures in Figures 8 and 9, it will be seen that when the switch element 322 engages the contacts 326, a circuit is closed through the magnetic reversing switch designated generally by the numeral 402 so as to cause the motor 86 to rotate in a given direction, which I shall refer to as the forward direction because in that direction the feed pump is operating to propel the hydraulic actuators 102 and 128 in a forward feeding direction. The forward functioning, however, of the motor 86 is contingent upon the closing of a magnetic switch 404, and this switch, in addition to conditioning the motor 86 for forward rotation, also electrically couples the rapid traverse motor 248 with main incoming lines 406. When the hydraulic actuator piston 312 is urged to the left (Figure 26) in response to fluid pressure from the pipe line 370, the switch element 324 engages the contacts 372 which acts through the magnetic switch 402 to connect the motor 86 in reverse, provided that a switch mechanism 408 (see particularly Figure 9) is conditioned so as to maintain contact between switch elements 410 and 412. The engagement of these contacts 410 and 412 causes the electrical coupling of lines 414 and 416 (see Figure 26), which act through the magnetic reversing switch 402 to connect the motor 86 in reverse with the power lines 406. It will be understood, however, that the switch mechanism 408 does not control the electrical conditioning of the motor 86 for forward rotation. It will also be noted that the same fluid pressure which causes the actuator piston 312 to be shifted to the left (Figure 26), also acts through a conduit 418 to urge a piston 420 in a hydraulic actuator 422 to the right against the action of a coil spring 424. This causes a disk 426, which carries the contact element 410 (Figure 9) to be shifted to the right into frictional engagement with the outer extremity of the shaft 428 of the motor 86. Thus, the forward rotation of the motor 86 tends to maintain contact between the elements 410 and 412 against the action of a coil spring 430, Figure 9, which is interposed between an anchoring screw 432 and the outer periphery of the disk 426 in such a manner as to normally urge the disk in such a direction as to maintain the element 410 out of contact with the element 412. However, as long as the contact between the elements 410 and 412 is maintained, the motor will be electrically conditioned for reverse rotation provided contact is established between the switch element 324 and the contacts 372 of the main reverse control switch 320 (Figure 26). The instant that the motor 86 begins to rotate in a reverse direction, namely, in the direction indicated by the arrow in Figure 9, contact between the elements 410 and 412 is broken, thereby disconnecting the motor from the operating circuit. In this manner I am able to effect the instantaneous stopping of the motor 86, and consequently the stopping of the work spindle 50 when the main control valve mechanism 250 is conditioned for rapid reverse movement. That is to say, the electrical system of control just described serves to effectively arrest the movement of the spindle driving motor the instant that the rapid traverse pump 226 becomes effective for shifting the actuators 102 and 128 in a rapid reverse direction.

A conventional speed selector 434 is employed to enable the motor 86 to be driven at a preselected speed. It will also be understood that the magnetic switches shown in Figure 26 may be of conventional design, and hence they have not been described in detail. By employing the switch mechanism 404 in the manner described, no rotation can be imparted to the motor 86, unless the rapid traverse pump is functioning. Assume, for example, that the power is accidentally thrown off the main line and both of the motors, 86 and 248, stop. If the operator leaves the machine and during his absence power on the main line is established, neither motor will operate unless the switch 404 is again closed. It will be apparent that by use of my improved circuit arrangement the safety of the operator is positively insured and no rotation of parts can inadvertently take place. Of course, if the operator should rotate the tool spindle in a direction that would cause the motor shaft 428 to rotate and effect contact between the elements 410 and 412, and the circuit was conditioned for reverse rotation of the motor 86, such a reverse rotation would take place to a very slight extent, but by reason of the immediate separation of the contacts 410 and 412, the power would be cut off. In any event such reverse starting of the motor would not be sudden, but very gradual and hence no possible injury to the operator could result.

Free wheeling structure

In the description of my invention given thus far I called attention to the motor driving arrangement wherein the motor 86 is coupled to the spindle through a pair of pulleys, 80 and 84 connected by means of a chain or belt 82. In Figures 28 to 30, inclusive, I have disclosed a modified arrangement wherein a motor 86a is mounted directly upon the spindle 50 by means of suitable preloaded anti-friction bearings 436 and 438. A pair of free wheeling clutches 440 of conventional design are employed, which include the usual rollers 442 and companion cam or clutch surfaces 444. Thus it will be apparent that when the motor 86a rotates in a clockwise direction as viewed from the right of Figure 28 and as shown by the directional arrow, a driving connection is established between the motor and the spindle 50. When the motor 86a is driven in a reverse direction, the driving connection between the motor and the spindle is broken.

The rotation of the motor in a direction which rotates the spindle 50 will be referred to as the forward rotation, and the opposite direction as the reverse rotation. Thus when the motor 86a rotates in the reverse direction, power is transmitted to a gear 446 through a gear 448 which rotates with the motor. Rotation of the gear 446 imparts rotation to a sheave 450, which is provided with an axially adjustable section 452. The sheave 450 is coupled with a similar sheave 454 through a belt 457. The sheave 454 acting through a shaft 456 and a free wheeling clutch 458 (see Figures 28 and 30) imparts rotation to one of the gears of a gear pump 226b. When the motor 86a and, likewise, the spindle 50 are driven to be rotated forwardly, the free wheeling clutch mechanism 458 operates to prevent transmission of power to the gear pump 226b.

From the foregoing it will be apparent that with my free wheeling arrangement I am able to employ a single motor for driving both the feed pump and the rapid traverse pump. In other words, the feed pump 76, which is driven from and in synchronism with the spindle 50, functions during the rotation of said spindle, and during this time the rapid traverse pump 226b is idle. Likewise, during the operative functioning of the rapid traverse pump 226b, the spindle, and consequently the feed pump 76, remain idle. To insure the delivery to the fluid system of sufficient fluid to take care of slight leakages in the packings and losses resulting from vibration and the like, I employ a small auxiliary gear pump 460, which is driven from a shaft 462 which supports the sheave 450. Thus the gear pump 460 functions continuously to supply fluid to a system. The sheave 454 is provided with a section 464, which may be shifted axially with respect to the shaft 457 by an adjusting nut 466 (Figure 28). By moving the sheave section 464 to the left, the belt may be moved inwardly to take up the greater spacing of the sheave sections, and the sheave section 452 of the sheave 450 will move outwardly against the action of a coil spring 468 to accommodate the slack in the belt. In this manner the speed at which the sheave 454, and consequently the rapid traverse pump 226b is operated, may be controlled by merely shifting the sheave sections 452 and 464. A cap 470 serves to house the spring 468 and to prevent the accumulation of foreign matter in this vicinity.

In using the above described free wheeling arrangement, I prefer that the gear 184, which meshes with the gear 186 on the spindle and which serves as a driving mechanism for the pump 76, be non-metallic. By using a non-metallic gear, I eliminate any vibratory action from the pump 76 and the spindle 50 and also appreciably eliminate noise.

Free wheeling circuit arrangement

In Figure 31 I have shown a circuit arrangement with the view of more clearly illustrating the adaptability of the free wheeling arrangement to hydro-electric control. In view of the fact that I have previously entered into a detailed description of the feed pump 76 and the electrical circuit arrangement, which includes the reversing switch 320, the magnetic reverse switch mechanism 402, the speed selector 424, etc., it will not be necessary to enter into a detailed discussion of these parts in order to obtain a clear understanding of the free wheeling control. It will suffice to say that in Figure 31 I have shown a single actuator which I shall designate generally as 472, and this actuator includes a cylinder 474 and a piston 476. A valve mechanism designated generally by the numeral 250a is similar to the valve mechanism 250 previously described, but is shown in association with a single actuator as distinguished from the plurality of actuators connected in a series circuit as described in connection with Figure 26. The gear pump 226b supplies fluid to the valve 250a through a conduit 478, and when a valve member 260a occupies the central position shown in Figure 31, fluid from the gear pump circulates without imparting movement to the actuator piston 476. The auxiliary and smaller gear pump 460 is shown as submerged within a fluid body 480 within a reservoir 482. This pump 460, as previously described, operates for the sole purpose of making up slight leakage resulting from wear of packings, etc., and also to maintain pressure at the intake side of the gear pump 226b, and thereby preclude the introduction of air that would otherwise result from the suction developed by the gear pump at its intake side. Sometimes, after a machine has stood for a considerable period, a replenishment of oil is required, and this can be taken care of very readily by the pump 460.

However, when the feed pump 76 functions intermittently, the fluid in the high pressure circuit, which includes said feed pump, is intermittently supplied with fresh fluid, and hence the use of the gear pump 460 for supplying fluid to a pipe line connecting the valve 250a with the right side of the actuator 472, is not necessary.

In Figure 31 I have shown a conduit 486 connecting the discharge side of the gear pump 460 with the conduit 484. The fluid entering the pipe line 486 is taken from the periphery of one of the gears in the gear pump 460, as distinguished from the fluid which is delivered to the intake conduit 488 of the gear pump 226b. Thus, fluid which passes out of the discharge port of the gear pump 460 through a conduit 490, enters the conduit 488. A valve 492 serves to close the system after it has been completely filled with fluid from the pump 460. The valve may be so constructed as to enable fluid to be taken out of the system, particularly in instances where the structure is not to be in use for a considerable length of time. By having the conduit 486 connected with the periphery of one of the gears in the pump 460, fluid pressure is supplied regardless of the direction of rotation of the gears in said pump. I prefer to employ a check valve 494 in the conduit 490, whereby, when the pump rotates so as to draw fluid from the conduit 490, the fluid in the system is prevented from being removed. Thus, the gear pump 460 may be operated in either direction by a single motor, such as the motor 86a previously described, or an arrangement may be had whereby a single motor may be driven independently of the spindle motor for operating the pump 460. Obviously other modifications and changes of the pump 460 may be made without departing from the spirit and scope of my invention.

A valve 496 connected in the return conduit 498 may be employed to permit air to pass into the reservoir 482, and to allow the large displacement gear pump 226b to circulate fluid when the system is initially filled with fluid, and thereby eliminate air which may be present in the fluid actuator and conduits or piping connected therewith. This valve 496 obviously is closed during the actual functioning of the fluid circuit in propelling the actuator 472.

It will be noted that the feed pump 76 is connected to the opposite sides of the actuator 472 by suitable conduits 500 and 502, and that the right side of the actuator 472 is connected by a conduit 504 with the valve mechanism 250a. When the valve member 260a is in neutral, fluid in a conduit 506 is subjected to low pressure. This conduit 506 connects with the reverse control actuator 314 previously described in Figure 26. Likewise, the fluid in a conduit 508 connected with the opposite side of the actuator 314 is under low pressure, and, due to the difference in area between the opposite sides of the piston 312, said piston will be shifted to the right so as to close the previously described circuit by the contacts 322 and 326. This causes the motor 86a to operate in a forward direction for propelling the spindle and consequently the feed pump 76. When the circuit is conditioned for rapid reverse movement, due to the shifting of the valve member 350, as previously described, the fluid conduit 508 is under substantially no pressure, and thus the pressure of the fluid supplied by the conduit 506 causes the actuator piston 312 to be shifted to the left, thereby connecting the motor 86a in reverse through the agency of the contact elements 324 and 372, as previously described, in connection with Figure 26. In this manner I am able to obtain a simultaneous reversal of both the electric motor and the hydraulic actuator 472.

A valve 510 shown in the pipe line 406 is employed in instances where it is found necessary to preclude fluid from the actuator 314 from passing back into the main control mechanism 250a when the valve is placed in neutral. This valve 510 may be referred to as the starting and stopping valve, and may be either manually or automatically controlled. By employing the valve 510, the actuator piston 312 is prevented from being inadvertently shifted from the reverse to the forward direction. There are other ways in which the inadvertent shifting of the reverse hydraulic actuator piston 312 may be controlled, but the foregoing description will serve as being illustrative of one operative arrangement. In instances where the valve 510 is not required other mechanisms may be employed to prevent the inadvertent shifting of the actuator piston 312.

From the foregoing description it will be apparent that the free wheeling drive is particularly adaptable for use in hydraulic controls or hydro-electric controls. In this connection I wish to call attention to the fact that a check valve 512 may be employed in the conduit 502 in instances where it is desirable to allow the rapid traverse pressure in the reverse side of the circuit without passing through the return end. Obviously the free wheeling arrangement is not limited to the circuit herein described, but is capable of numerous other practical applications in the field of hydraulic controls for machine tools and the like.

*Application of ball valve pump to the closed circuit*

I have previously described in a general way the use of a pump, such as the ball valve type pump 76 in connection with the hydraulic circuit for controlling the various hydraulic actuators of the machine. I wish to further point out that the arrangement of the ball valves 200 and 202 is such as to render them peculiarly adaptable for use in closed circuits. I have had pumps of this particular design in operation for a considerable period of time and have found that the ball valve arrangement stands up under the severest operating conditions and is adapted for continuous use over an extended period of time without repair or replacement.

Particular attention is directed to the fact that by using the ball valve arrangement in a closed circuit as shown herein, the clashing of the balls 212 as they seat themselves is positively precluded. This will be more readily appreciated by referring to Figures 24 and 25, wherein I have shown the balls 212 seated through the yieldable action of the coiled spring 214. Assume now that the pump piston 196, which is companion to the ball valve shown in Figures 24 and 25, begins to experience an inward movement. This enables fluid from the annular port or passage 208 connected with the discharge side of an actuator piston, for example, the hydraulic actuator cylinder 130, Figure 26, to be delivered to the ball valve 212. This ball 212 will thus unseat and permit fluid to enter the companion passage 198 at a speed which is determined by the speed with which the companion plunger 196 moves inwardly. When the plunger reaches the limit of its intake stroke and is about to move in a reverse direction, the flow of fluid past the ball 212 ceases and the pressure on the opposite sides of the ball becomes substantially equalized, thereby enabling the ball to gently seat itself at the instant the pump piston 196 begins its compressive stroke. In other words, there is no clashing or violent seating of the ball 212, but, on the contrary, a very gentle seating thereof. The round seat which corresponds to the spherical surface of the ball also contributes toward the effective functioning of the valve. In this connection I again make reference to the fact that the cross-sectional area of the spaces 220 indicated on Figure 25 is less than the cross-sectional area in the passageway 210. Thus, a higher speed of fluid takes place within the area 220, and thereby enables the ball 212 to be perfectly centered during the opening thereof. Therefore, as the ball gradually moves into juxta-position with its seat 218, the speed of the fluid acting within the area 220 serves to maintain the centered relationship of the ball with respect to its seat, and thereby precludes any engagement or clashing of the ball with the side walls surrounding the ball.

It will also be apparent that by employing the ball valve arrangement just described, fluid pressure acting on the balls cooperates to maintain the balls tightly sealed against their respective seats. This shoud be clearly distinguished from rotary types of valves and others wherein the pressure of the fluid acting upon the valve does not function to urge the valve against a seat. The importance of the ball valve construction will be readily apparent when it is understood that in a closed circuit arrangement employed for the purpose of accurately and uniformly propelling a machine tool, the slightest slippage of fluid past a valve during the compression stroke of the pump piston will seriously affect the uniformity of fluid flow, and will also cause a decided increase in fluid temperature. In fact, one of the most serious problems with which hydraulic engineers have been confronted in recent years is that of temperature increase resulting from the slippage or leakage of fluid along the bearing surfaces of rotary type valves. In my device the pressure of the fluid developed during the compressing stroke of the pump pistons will act upon the intake ball valves so as to positively seal the balls 212 against the seat 218.

To more clearly illustrate the adaptability of the ball valve pump to various hydraulic circuits, I make reference to Figure 27 wherein I have shown said pump included in a circuit containing a valve mechanism 250b, which corresponds functionally and structurally with the valve mechanisms 250 and 250a previously described. In this circuit fluid is received from the reservoir 236c and is delivered from said pump through a conduit 514 into the valve mechanism 250b. A hydraulic actuator 516 including a cylinder 518 and a piston 520 is connected in a closed circuit with the pump 76 by suitable conduits 522 and 524. The pump 76 is driven from a spindle 50c, which in turn is driven through a gear train 526 and a clutch mechanism 528 from a prime mover or electric motor 86c. A hydraulic actuator 530 is employed to control the operative functioning of the clutch mechanism 528. This hydraulic actuator may be manually or automatically controlled in timed relation with the movement of a tool carriage 532 shifted by the hydraulic actuator 516. Fluid is returned to the reservoir 236c through a return conduit or pipe line 534 and a restricted orifice 536.

In instances where it is desirable, a conduit or pipe line 538 containing a check valve 540 may be connected as shown. In this manner fluid from the gear pump is constantly directed through the pipe line 538 and serves as a leakage supply pump, but not as a charging pump for the feed pump 76. The feed pump 76 is adapted, as previously described, to function in a closed circuit so as to receive fluid from the advancing side of the actuator 516 and deliver fluid under increased pressure through the conduit 522 to said actuator without the use of an auxiliary charging pump. That is to say, the fluid supplied from the advancing side of the actuator is sufficient to charge the pump pistons. However, to take care of leakage through bearings, fittings, and the like, it may be desirable to connect the pump 226c with the high pressure side of the feed circuit through the agency of the conduit 538, as indicated in Figure 27. It may also be desirable in certain instances to connect the intake or return conduit 524 of the feed pump 76 with a conduit 541. By connecting the conduits 538 and 541 with the peripheries of the gears in the pump 226c, fluid may be continuously supplied regardless of the direction in which the pump 226c is driven.

*Modified feed pump*

In Figures 32 to 36, inclusive, I have disclosed a modified feed pump construction, which I shall designate generally by the numeral 76a. This pump has structural features quite similar in some respects to the feed pump 76 previously described and shown in detail in Figures 19 to 25, inclusive. These similar structural features include a central housing or casing 166a, a pump driving mechanism 168a, an end plate 170a, and an oppositely disposed housing 172a. Preloaded anti-friction bearings 174a support a rotary driving member or sleeve 176a. Longitudinal displacement of the sleeve 176a to the right is prevented by a clamping ring 178a and an adjusting screw 180a as previously described in connection with the pump 76.

The fundamental structural difference between the pump 76a and the pump 76 previously described is the type of control valves. In the pump 76a a plurality of control valves 542 are employed which serve the same purpose as the ball valves of the pump 76, in that they control the flow of fluid toward and away from the pump pistons 196a.

Movement of the valves 542 is timingly controlled by means of a cam 544 carried by and rotatable with the sleeve 176a. Fluid enters the pump 76a through a port 208a, and this port is connected by passageways 546 with the valve 542 companion thereto (see particularly Figure 36). Fluid entering the passage 546 is conducted through a passage 548 which is adapted to communicate with an annular passage or port 550 in the valve member 542, and thereby direct the fluid through a passage 552 to the companion piston, which is experiencing its intake stroke. Upon the completion of the intake stroke and the commencement of the compression stroke, the cam 544 causes the valve to shift to the right, thereby closing communication to the passage 548 and opening communication between the passage 552 and a discharge passage 554, which communicates with a discharge port 556. Thus it will be apparent that the valves 542, in response to the rotation of the cam 544, are timingly shifted to conform with the positions occupied by the respective pump pistons 196a. The driving mechanisms for the pump pistons 196a are similar to the driving mechanisms previously described in connection with the pump 76, and include such elements as pivoted fingers 194a and driving rings 190a.

Modified ball valve pump

In Figures 39 and 40 I have disclosed a modified feed pump construction designated generally by the numeral 76b. This pump is similar in many respects to the ball valve pump 76 shown in Figure 19, but differs therefrom in providing a tapered rotary valve 558 having a peripheral port 560, which serves to timingly control the flow of fluid toward the passages 562. Fluid enters the pump chamber through an opening 564 which communicates with an end chamber 566. An anti-friction thrust bearing 568 and clamping ring 570 serve to secure the rotary valve 558 against longitudinal movement to the left. Fluid from the chamber 566 passes through an internal longitudinal passage 572, which communicates with the valve port 560 through radial passages 574. As the valve port 560 sweeps through its orbit, it causes fluid to be delivered to the upper ends of the pump pistons 196b during their intake or inward stroke. As the pistons 196b are moved outwardly, fluid under compression in the passageways 562 passes through a ball valve 576 and thence into passageways 578, which communicate with a discharge port 580.

The tapered arrangement of the rotary valve 558 precludes slippage of fluid toward the larger end of the valve, namely, to the left, Figure 39, and any fluid that may migrate in that direction is received by an annular passage 582, which communicates with the intake passage 572 through a radial opening 584. A second annular valve passage or port 586 communicates with a passage 588 adapted to be connected with a source of fluid pressure (not shown). The use of fluid pressure at this point serves to insure lubrication and to further counteract any leakage or migration of fluid along the surface of the valve 558 toward the larger end thereof. The valve 558 is driven from a driving mechanism 168b, which is similar in functional and structural characteristics to the mechanisms 168 and 168a previously described.

By employing the ball valves 576 I preclude the necessity of using a port in the valve member 558 similar to the port 560. In this manner I prevent the rotary valve 558 from experiencing fluid pressure which might have a tendency to cause the valve to bind or wear along the peripheral surfaces positioned at each side of the peripheral valve port 560. While the fluid pressure from the passageways 562 does exert itself through radial passages 590 provided in the bushing 592 which supports the rotary valve 558, this pressure is exerted against a relatively small area of the valve, and hence merely serves to counteract the pressure of fluid acting within the peripheral port 560. This construction maintains the valve 558 in a balanced or floating condition within the bearing or bushing 592. That is to say, the pressure of fluid acting on one side of the valve is substantially counter-balanced by the pressure of the fluid acting on the opposite side, thereby maintaining the valve in a state of rotative balance.

Modified control circuit

In Figure 26 I have disclosed a circuit arrangement wherein the rear tool carriage 122 is controlled in response to the movement of the front tool carriage 94. In Figure 41 I have shown a modified circuit arrangement whereby the front and rear tool carriages are independently controlled. It will be seen that the front carriage actuator 108a, which corresponds with the actuator 108 shown in Figure 26, is connected through a valve mechanism 250c, which corresponds with the valve mechanism 250 and 250a previously described. However, the valve 250c is not hydraulically coupled with the rear tool actuator 128a. In Figure 41 I disclose a gear pump 226d which, through a conduit 594, delivers fluid to the valve mechanism 250c, and a separate gear pump 226e which delivers fluid through a conduit 596 to a valve mechanism 250d. A feed pump 76c is coupled with the hydraulic actuator 102a in the same manner as the feed pump 76 is coupled with the actuator 102 in Figure 26. Thus, the feed pump 76c, the actuator 102a, and the actuator 108a are connected within a circuit which is independent of the circuit including the valve mechanism 250d about to be described.

The valve mechanism 250d includes a valve member 598 and a reversing valve member 600. The position of the reversing valve 600 within a valve housing 602 is governed by the position of the valve member 598, as will presently appear. With the valve member 598 in the neutral position shown in Figure 41, fluid from the rapid traverse or gear pump 226e passes through the conduit 596 and enters a valve port 604. From this valve port 604 said fluid enters a radial valve passage 606 and passes through a longitudinal passage 608 into an end chamber 610. From the chamber 610 the fluid passes through a conduit 612 and thence through a restricted orifice 614 into a reservoir 616. This fluid from the pump 226e circulates back to the reservoir 616 without imparting movement to the actuator piston 130a of the hydraulic actuator 128a.

Assume that the valve member 598 is shifted to the right by an operator in the same manner as described in connection with the valve 250, and that the feed pump 76c is not functioning. The restriction in communication between the radial ports 606 and the passage or port 604 which takes place as the valve 598 shifts to the right, causes a sudden increase in fluid pressure within the side passages or areas 618. Simultaneously with this increase in pressure, a port or passage 620 is opened by the valve section 622, thereby enabling fluid pressure to be transmitted through a passage 624 which communicates with a chamber 626 at the left end of the reversing valve 600. This causes the valve 600 to be suddenly shifted to the right from the position shown in Figure 41. This shifted position will hereinafter be referred to as the forward position. As the valve member 598 continues to move to the right, a valve port 628 is opened to receive fluid from the gear pump 226e and to direct said fluid through a conduit 630 to the rear end of the hydraulic actuator 128a. This causes rapid forward movement of the actuator piston 130a, which piston is connected with the rear tool carriage 122a. Fluid from the advancing side of the piston 130a passes through a conduit 632 and then through a port 634 which is now in communication with an end chamber 636

636. This chamber 636 is constantly in communication with the opposite chamber 610, which, in turn, is connected with the reservoir 616. The connection between the chambers 636 and 610 is indicated diagrammatically by the dotted lines 638.

When the tool carriage 122a reaches the cutting position, the valve member 598 is either manually or automatically, through the agency of the dog carrying disk 334a, shifted back to the central or neutral position shown in Figure 1. At this point it will be understood that when the valve member 598 was initially shifted to the right, a hydraulic actuator 314a, similar to the hydraulic actuator 314 previously described, causes a circuit including a motor 86d to be closed through the agency of the switch mechanism 320a so as to cause the pump 78c to function. Thus, when the valve member 598 is shifted back to its neutral position, the feed pump 78c is conditioned for delivering fluid at a feeding rate to the rear end of the hydraulic actuator 128a through a conduit 640, a valve passage 642, a conduit 644, and a conduit 646. Fluid from the forward end of the actuator 128a passes through the conduit 632 and the valve port 634 then in communication with a chamber 648, the latter communicating with the chamber 636 through a passageway 650. The chamber 636, as previously described, communicates with the reservoir 616 through the restricted orifice 614.

Upon the completion of the feeding stroke of the piston 130a, the valve member 598 is either manually or automatically shifted slightly to the left (Figure 41). This slight shifting of the valve 598 uncovers the port 652, thereby establishing communication between the passage 624 and the chamber 610 through the needle valve 654. The presence of the needle valve 654 effects a slow passage of fluid from the left end of the valve 600, thereby retarding the movement of said valve to the left. This causes the actuator piston 130a to experience a dwell before actual reversal thereof takes place. When the valve member 600 finally shifts to the left ad occupies the position shown in Figure 41, the high pressure fluid from the feed pump 78c is directed into the forward end of the actuator 128a, thereby causing the actuator piston 130a to experience a reverse feeding movement. When the actuator piston 130a has been shifted the desired distance at a reverse feeding rate, the valve 598 is shifted to the left, thereby uncovering the valve port 628 and a valve port 656. This causes fluid to be delivered from the rapid traverse pump 226e, through the valve port 656 and a conduit 658, to the forward end of the actuator 128a, and thus the actuator piston 130a is moved rearwardly at a rapid rate. It will be apparent from the foregoing description that the initial shifting of the valve member 598 to the left, again causes an increase in fluid pressure in the passageways 618, and this pressure is transmitted through a passageway 660, which communicates with a chamber 662 at the right end of the valve member 600. The pressure in the chamber 662 acting on the valve member 600 causes the shifting thereof to the left, and fluid from the forward end of the valve passes slowly back to the chamber 610 in accordance with the restriction presented by the needle valve 654.

Attention is also directed to the fact that when the valve member 598 is completely shifted to the left, fluid pressure within a conduit 664 is transmitted to the right end of the actuator 314a so as to actuate the control switch 320a. This causes the prime mover or motor 86d to be electrically disconnected from the circuit (not shown). From the foregoing description it will be apparent that the improved circuit arrangement disclosed in Figure 41 enables the actuator piston 130a to experience the following cycle of operation: First, rapid forward movement; second, feeding forward movement; third, a predetermined dwell upon the completion of the forward feeding movement; fourth, feeding reverse movement; and fifth, rapid reverse movement to the point of starting.

The dwell of the carriage 122a may serve various purposes—for example, it may be desirable to cause a dwell of the rear carriage to enable the completion of a stroke by the front carriage, or it may be desirable to employ the dwell for the purpose of making a finishing cut at the end of the forward feeding stroke. It will be seen that, when employing the circuit disclosed in Figure 41, the control disk 334a is driven in synchronism with the transverse movement of the rear carriage 122a through the agency of a gear 666 keyed to a shaft 668, which supports the disk 334a, a companion gear 670, a drive shaft 672, and a gear 674 which meshes with a rack 676 provided on the carriage 122a. Thus, as the carriage 122a moves forwardly toward the work in response to the actuator 128a, rotation is imparted to the disk 334a, so that elements, such as dogs 678 and 680 carried thereby are timingly moved into engagement with companion fingers 682 and 684, respectively, mounted on a vertical actuator shaft 686 of the valve mechanism 250d. A detailed description of the fingers, dogs, and valve operating mechanism is not necessary to a clear understanding of the invention, and hence the positioning thereof, etc., has not been described in detail. For further information concerning the functional characteristics of these parts, reference is made to the previous description in connection with the valve mechanism 250.

Summary

From the foregoing it will be apparent that my invention contemplates not only the provision of an improved machine tool, but also improved mechanism for controlling the automatic functioning thereof. The constituent parts of the machine are relatively few in number, and are combined in a manner which makes for simplicity, rigidity, and durability. It will also be noted that my machine is free from clutches and the gear trains normally incident to the use of clutches. As previously pointed out, such mechanisms place a decided limitation upon the load-carrying ability of a machine in proportion to the power required to propel the machine. In other words, frictional losses are greatly reduced through my simple improved design.

In addition to the above mentioned and other advantages, my improved hydraulic and electrical control circuits, which might properly be referred to as hydro-electric controls, represent a distinct advance over other controls of conventional design with which I am familiar. The simple plugging arrangement for the motor and the hydraulic arrangement coupled therewith present a decided advantage both from the standpoint of design and actual use in the field. My invention enables the use of electric motors which have a wide range of rotative speeds, from a relatively slow speed to a relatively high speed. The pump mechanisms heretofore described cooperate to improve the operative effectiveness of my closed hydraulic circuits, and I make especial reference to the ball valve arrangement which lends itself particularly in instances where it is desirable to positively prevent the slippage or leakage of fluid from the high to the low pressure side of a system. The free-wheeling and other novel arrangements herein described are also of important, practical significance in the field of machine tool design. It will also be apparent that my invention contemplates a machine tool equipped with a plurality of carriages, in which one carriage may be operable in response to or independently of another carriage. Both types of systems have practical applications in the metal working art.

Attention is also directed to the fact that in the diagrammatic disclosure of Figure 26 I have indicated the switch mechanism 320 somewhat schematically, whereas in Figures 1, 2, 4, and 5, disclosing the machine, I have shown this switch mechanism in accordance with the commercial design. In the commercial design, the parts thereof are rotary, thereby enabling the shifting of the switch through the agency of a gear 688, which connects with a piston of the actuator 314 through a rack bar 690. A control handle 692 enables the manual manipulation of the parts when desired.

Obviously the invention is not limited to the specific structures disclosed herein, but is capable of numerous other modifications and changes without departing from the spirit and scope of my invention.

Having thus described my invention, what I claim as new and desire to obtain by Letters Patent is:

1. In material working apparatus, a rotary machine spindle, a support, means including a hydraulic actuator for causing relative translation between the spindle and support, pump mechanism for delivering fluid to said actuator, a prime mover for imparting rotation to said spindle in timed relation with the functioning of said pump mechanism, and power operated control means for effecting the automatic starting and stopping of said prime mover in timed relation with the relative movement between the spindle and support.

2. In material working apparatus, a rotary machine spindle, a support, means including a hydraulic actuator for causing relative translation between the spindle and support, pump mechanism for delivering fluid to said actuator, an electric motor for imparting rotation to said spindle in timed relation with the functioning of said pump mechanism, and power operated control means for effecting the automatic starting and stopping of said electric motor in timed relation with the relative movement between the spindle and support.

3. In material working apparatus, a rotary machine spindle, a support, means including a hydraulic actuator for causing relative translation between the spindle and support, pump mechanism for delivering fluid to said actuator, a prime mover for imparting rotation to said spindle and for actuating said pump mechanism, driving means for relatively translating said spindle and support at a rapid rate, a prime mover for said driving means, and means for automatically controlling the starting and stopping of one of said prime movers in accordance with the relative positions occupied by said machine spindle and support.

4. A lathe including a rotary work spindle, a carriage which is translatable with respect to said spindle, means including a hydraulic actuator for effecting movement of said carriage, pump mechanism for delivering fluid to said actuator, a prime mover for imparting rotation to said spindle and for driving said pump mechanism, and control means for effecting the automatic starting and stopping of said prime mover in timed relation with the relative movement between the spindle and carriage.

5. In material working apparatus, a rotary machine spindle, a support, means including a hydraulic actuator for causing relative translation between the spindle and support, pump mechanism for delivering fluid to said actuator, a reversible electric motor for imparting rotation to said spindle, and control means for effecting the automatic stopping of said motor by connecting said motor in reverse for a period which is sufficient to arrest forward rotation of the motor.

6. In material working apparatus, a rotary machine spindle, a support, means including a hydraulic actuator for causing relative translation between the spindle and support, pump mechanism for delivering fluid to said actuator, a reversible electric motor for imparting rotation to said spindle, and hydro-electric control means for effecting the automatic stopping of said motor in timed relation with the relative movement between the spindle and the support.

7. In material working apparatus, a rotary machine spindle, a support, means including a hydraulic actuator for causing relative translation between the spindle and support, pump mechanism for delivering fluid to said actuator, a reversible electric motor for imparting rotation to said spindle and for actuating said pump mechanism, control means for effecting the automatic stopping of said motor by connecting said motor in reverse for a period which is sufficient to arrest forward rotation of the motor, and means for preventing inadvertent reverse rotation of the motor subsequent to the stopping thereof.

8. A transmission including a reversible electric motor, a spindle driven by said motor, a pump mechanism driven in synchronism with said motor and spindle, and means including control mechanism for effecting a braking action upon said motor to arrest rotation thereof in a given direction.

9. A transmission including a reversible electric motor, a spindle driven by said motor, a pump mechanism driven in synchronism with said motor and spindle, rapid traverse driving mechanism adapted to function independently of said pump mechanism, and means for effecting a braking action upon said motor to arrest rotation thereof in a given direction without affecting the operative functioning of said rapid traverse driving mechanism.

10. A transmission including an electric motor, a spindle adapted to be driven by said motor, a feed pump driven in synchronism with said motor and spindle, a rapid traverse pump, driving means for said rapid traverse pump, and means for controlling the operative functioning of said pumps including mechanism for arresting said motor by disconnecting said motor electrically and applying a breaking action upon said motor to thereby enable the independent functioning of the rapid traverse pump.

11. A hydraulic actuator system for propelling machine parts and the like including a hydraulic actuator, a feed pump, an electric motor for driving said pump, a rapid traverse pump, driving means therefor, a control valve mechanism for governing the flow of fluid between said pumps and said actuator, and control mechanism operable in accordance with the position of said valve mechanism for controlling the starting and stopping of said electric motor, said rapid traverse pump being adapted to function independently of said feed pump for propelling said actuator.

12. A hydraulic actuator system for propelling machine parts and the like including a hydraulic actuator, a feed pump, an electric motor for driving said pump, a rapid traverse pump, driving means therefor, a control valve mechanism for governing the flow of fluid between said pumps and said actuator, and control mechanism operable in accordance with the position of said valve mechanism for controlling the starting and stopping of said electric motor, said feed pump being adapted to function independently of said rapid traverse pump for propelling said actuator.

13. A hydraulic actuator system including a hydraulic actuator having a piston and cylinder construction, a feed pump connected in a closed circuit with said actuator, said feed pump including a plurality of reciprocable plungers adapted to receive fluid during their intake stroke from the discharge side of the actuator and to deliver fluid under increased pressure during their compression stroke to the intake side of said actuator for propelling purposes, and valve means including a ball valve within a housing adapted to open and close automatically in accordance with the movement of a companion plunger in the pump.

14. A transmission including a spindle, a reversible prime mover connected with said spindle, a free wheeling control for causing the spindle to rotate when the prime mover operates in one direction and to be operatively disengaged from said prime mover upon reverse rotation thereof, a driving mechanism operable only when rotation is imparted to the spindle, and a rapid traverse driving mechanism operable only when reverse rotation is experienced by the prime mover.

15. A transmission including a spindle, a reversible prime mover connected with said spindle, a free wheeling control for causing the spindle to rotate when the prime mover operates in one direction and to be operatively disengaged from said prime mover upon reverse rotation thereof, a driving mechanism operable only when rotation is imparted to the spindle, a rapid traverse driving mechanism operable only when reverse rotation is experienced by the prime mover, and a hydro-electric control for governing the timed functioning of said driving mechanisms.

16. A hydraulic actuator system for controlling the movements of machine parts and the like including a hydraulic actuator for propelling a machine element, a feed pump for propelling said actuator at a feeding rate, rapid traverse mechanism for propelling said actuator at a faster rate, and control mechanism whereby said actuator experiences a cycle of operation including first, rapid forward movement; second, feeding forward movement; third, feeding reverse movement; and fourth, rapid traverse reverse movement.

17. A hydraulic actuator system for controlling the movements of machine parts and the like including a hydraulic actuator for propelling a machine element, a feed pump for propelling said actuator at a feeding rate, rapid traverse mechanism for propelling said actuator at a faster rate, control mechanism whereby said actuator experiences a cycle of operation including first, rapid forward movement; second, feeding forward movement; third, feeding reverse movement; and fourth, rapid traverse reverse movement; and means for causing said actuator to experience a dwell upon the completion of its forward feeding movement.

18. In material working apparatus, a rotary machine spindle, a support, means including a hydraulic actuator for causing relative translation between the spindle and support, pump mechanism for delivering fluid to said actuator, a prime mover for imparting rotation to said spindle, and control means for effecting the automatic starting and stopping of said prime mover in timed relation with the relative translation between the spindle and support, said control means including mechanism for subjecting the prime mover to a reverse torque in effecting the stopping thereof.

19. In material working apparatus, a rotary machine spindle, a support, means including a hydraulic actuator for causing relative translation between the spindle and support, pump mechanism for delivering fluid to said actuator, an electrical prime mover for imparting rotation to said spindle, and control means including an electrical circuit arrangement for subjecting the prime mover to reverse torque and thereby effecting the automatic stopping thereof in timed relation with the relative translation between the spindle and support.

20. In material working apparatus, a rotary machine spindle, a support, means for causing relative translation between the spindle and support, a prime mover for imparting rotation to said spindle, and control means for effecting automatic starting and stopping of said prime mover in timed relation with the relative translation between the spindle and support, said control means including mechanism for subjecting the prime mover to a reverse torque for stopping said prime mover.

21. In material working apparatus, a rotary machine spindle, a support, means for causing relative translation between the spindle and support, an electrical prime mover for imparting rotation to said spindle, and control means including an electrical circuit arrangement for subjecting the prime mover to reverse torque to thereby effect the automatic stopping thereof in timed relation with the relative translation between the spindle and support.

22. In material working apparatus, a rotary machine spindle, a support, actuator means for causing relative translation between the spindle and support, an electrical prime mover operable in at least one direction for imparting rotation to said spindle, means whereby said prime mover is adapted to function in an opposite direction without imparting rotation to said spindle, and means for timingly controlling the operative functioning of said prime mover with respect to said spindle.

23. In a transmission, a rotary spindle, a support for said spindle, an electrical prime mover for rotating said spindle, and an electrical control arrangement including a switch mechanism adapted to be driven in one direction by said spindle to electrically condition said prime mover for reverse actuation and adapted when shifted in the opposite direction to render said prime mover electrically inoperative for actuation in at least one direction.

24. In a transmission, a rotary spindle, a support for said spindle, an electrical prime mover for rotating said spindle, and an electrical control arrangement including a switch mechanism for frictional engagement with said spindle and adapted to be driven in one direction by said spindle to electrically condition said prime mover for reverse actuation and adapted when shifted in the opposite direction to render said prime moved electrically inoperative for actuation in at least one direction.

25. In a transmission, a rotary spindle, a support for said spindle, an electrical prime mover for rotating said spindle, an electrical control arrangement including a switch mechanism adapted to be rotated in one direction by said spindle to electrically condition said prime mover for reverse actuation and adapted when rotated in the opposite direction to render said prime mover electrically inoperative for actuation in at least one direction, and fluid operated mechanism for imparting movement in a given direction to said switch mechanism.

26. In a transmission, a rotary spindle, a support for said spindle, an electrical prime mover for rotating said spindle, an electrical control arrangement including a switch mechanism adapted to be rotatably driven in one direction by said spindle to electrically condition said prime mover for reverse actuation and adapted when rotatably driven in the opposite direction to render said prime mover electrically for actuation in at least one direction inoperative, fluid operated mechanism for imparting movement to said switch mechanism in a given direction, and yieldable means for shifting said switch mechanism in an opposite direction.

27. In a transmission, a rotary spindle, a support for said spindle, an electrical prime mover for rotating said spindle, an electrical control arrangement including a switch mechanism adapted to be driven in one direction by said spindle to electrically condition said prime mover for reverse actuation and adapted when shifted in the opposite direction to render said prime mover electrically inoperative for actuation in at least one direction, and yieldable means for urging said switch mechanism in a direction to render said prime mover electrically inoperative for actuation in at least one direction.

28. A transmission including a reversible electric motor, a spindle driven by said motor, a pump mechanism driven in synchronism with said spindle and motor, and means for electrically subjecting the motor to reverse driving torque to thereby effect the stopping of said electric motor and spindle.

29. Transmission mechanism including a reversible electric motor, a rotary spindle, a transmission for said spindle adapted to be driven by said motor when said motor operates in a given direction, a supporting member shiftable relatively with respect to said spindle, feeding transmission for propelling said supporting member at a feeding speed and driven from said electric motor when said motor operates in said given direction, another transmission for propelling said supporting member at a faster speed and driven by said electric motor when said motor operates in a direction opposite to said given direction, and control mechanism for governing the timed functioning of said transmissions.

30. Transmission mechanism including a reversible electric motor, a rotary spindle, a transmission for said spindle adapted to be driven by said motor when said motor operates in a given direction, a supporting member shiftable relatively with respect to said spindle, feeding transmission for propelling said supporting member at a feeding speed and driven from said electric motor when said motor operates in said given direction, another transmission for propelling said supporting member at a faster speed and driven by said electric motor when said motor operates in a direction opposite to said given direction, control mechanism for governing the timed functioning of said transmissions, and means for varying the speed of said faster transmission.

31. Transmission mechanism including a reversible electric motor, a rotary spindle, a transmission for said spindle adapted to be driven by said motor when said motor operates in a given direction, a supporting member shiftable relatively with respect to said spindle, feeding transmission for propelling said supporting member at a feeding speed and driven from said electric motor when said motor operates in said given direction, another transmission for propelling said supporting member at a faster speed and driven by said electric motor when said motor operates in a direction opposite to said given direction, control mechanism for governing the timed functioning of said transmssions, and belt driving means including two rotating members for varying the speed of said faster transmission, said rotary members being axially adjustable for varying the speed of said faster transmission.

32. A transmission including a frame, a spindle rotatable within said frame, a prime mover for rotating said spindle, a variable delivery pump having a rotary piston actuating member driven by said prime mover in synchronism with said spindle, said pump including a plurality of shiftable pistons adapted to be actuated by said rotary piston actuating member during their compressive strokes, shiftable valve members for timingly controlling the flow of fluid toward and away from said pistons, a hydraulic actuator, and means hydraulically connecting said pump and actuator in a manner to insure the timed functioning of said valve members in synchronism with said rotary piston actuating member whereby to synchronize the movement of the actuator and the rotation of said spindle.

33. A transmission including a frame, a spindle rotatable within said frame, a prime mover for rotating said spindle, a variable delivery pump having a rotary piston actuating member driven by said prime mover in synchronism with said spindle, said pump including a plurality of shiftable pistons adapted to be actuated by said rotary piston actuating member during their compressive strokes, shiftable ball valve members for timingly controlling the flow of fluid toward and away from said pistons, a hydraulic actuator, and means hydraulically connecting said pump and actuator in a manner to insure the timed functioning of said valve members in synchronism with said rotary piston actuating member whereby to synchronize the movement of the actuator and the rotation of said spindle.

34. A transmission including a frame, a spindle rotatable within said frame, a prime mover for rotating said spindle, a variable delivery pump having a rotary piston actuating member driven by said prime mover in synchronism with said spindle, said pump including a plurality of shiftable pistons adapted to be actuated by said rotary piston actuating member during their compressive strokes, shiftable valve members for timingly controlling the flow of fluid toward and away from said pistons, a hydraulic actuator, means hydraulically connecting said pump and actuator in a manner to insure the timed functioning of said valve members in synchronism with said rotary piston actuating member whereby to synchronize the movement of the actuator and the rotation of said spindle, and a shiftable finger interposed between said rotary piston actuating member and each of said pistons.

35. A control structure for machine tools including a supporting bar adapted to be about an axis and reciprocated, a supporting means for said bar, power means for imparting said oscillation and reciprocation to said bar, a shiftable control member, abutment means carried thereby, and gearing providing a driving connection between said supporting bar and said shiftable control member, whereby to effect the shifting of said control member in accordance with the oscillatory and reciprocatory movements experienced by said supporting bar.

36. Control mechanism for machine tools including a plurality of actuators, a shiftable control member, transmission means between said actuators and control member for simultaneously imparting movement from said actuators to said control member, power means for propelling said actuators, and means operable as an incident to the movement of said shiftable control member for governing the timed functioning of said actuators.

37. A control arrangement for machine tools including a shiftable supporting member, a mounting therefor, a plurality of actuators adapted to shift said supporting member, and control means within one of said actuators for governing the initiation of the propelling action by another of said actuators.

38. A machine tool structure including a supporting spindle, a pulley drivingly connected with said spindle, an electric motor, a driving pulley driven from said motor, a belt connection between said pulleys whereby to effect the transmission of power from said electric motor to said spindle, an adjustable support for said electric motor, a unitary frame structure for supporting and completely housing said spindle and said electric motor, and means in said frame structure to permit circulation of air whereby to preclude overheating of the parts within said housing and to preclude the accumulation of foreign matter on said parts.

39. Control means for combined hydraulic and electrical transmissions including a fluid operated motor, valve means for controlling the actuation of said motor, fluid pressure generating means, conduits connecting said fluid pressure generating means with said motor, an electrical control element, means connecting said fluid operated motor with said electrical control element whereby said electrical control element is actuated in synchronism with said fluid operated motor, and means including a manually operable lever for disconnecting said fluid operated motor from said electrical control element whereby to enable manual control of said fluid operated motor.

40. In a hydraulic actuator system, a hydraulic actuator, a support, a housing, a plurality of reciprocable fluid compressing plungers in said housing, driving mechanism for shifting said plungers during their compression stroke, valve means including ball valve members adapted to open and close in timed relation with the functioning of said plungers, said valve members being arranged in pairs, each pair companion to one plunger, a passageway for each pair of valves adapted to direct fluid to one of said valves, a passageway companion to the other valve of each pair for directing fluid away from said plungers, a hydraulic circuit arrangement connecting said plungers with said hydraulic actuator, and power means for actuating the driving mechanism to shift said plungers.

41. A lathe including an elongated bed forming the lowermost supporting structure, a headstock structure formed integral with said bed at one end thereof, a tailstock structure formed integral with said bed at the opposite end thereof and in substantial alinement with said headstock structure, a front tool carriage, and a supporting structure in the vicinity of said tool carriage formed integral with said bed, the aforesaid integrally disposed parts cooperating to present a substantially non-vibratory supporting structure for a work piece during the machining thereof.

42. In a transmission an electrical circuit arrangement including a reversible electric motor for imparting a driving action to a machine element, a fluid circuit arrangement including fluid pressure generating means and a hydraulic actuator for propelling another machine element, said pressure generating means being operable in response to the functioning of the motor in said electrical circuit arrangement, and control mechanism for said fluid and electrical circuits adapted to be initiated as an incident to the functioning of said fluid circuit for causing said electric motor to experience a reverse driving torque.

43. In a transmission an electrical circuit arrangement including a reversible electric motor for imparting a driving action to a machine element, fluid circuit arrangements including fluid pressure generating means and a hydraulic actuator for propelling another machine element at various speeds in opposite directions, said pressure generator means being operable in response to the functioning of the motor in said electrical circuit arrangement, and control mechanism for said fluid and electrical circuits adapted to be initiated as an incident to the functioning of at least one of said fluid circuit arrangements for causing said electric motor to experience a reverse driving torque.

44. In a transmission an electrical circuit arrangement including a reversible electric motor for imparting a driving action to a machine element, fluid circuit arrangements including fluid pressure generating means and a hydraulic actuator for propelling another machine element at rapid traverse and feeding speeds, said fluid pressure generating means being operable in response to the functioning of the motor in said electrical circuit arrengement, rapid traverse power means, and control mechanism for said fluid and electrical circuits adapted to be initiated as an incident to the functioning of at least one of said fluid circuit arrangements for causing said electric motor to experience a reverse driving torque.

45. In a transmission an electrical circuit arrangement including a reversible electric motor for imparting a driving action to a machine element, a fluid circuit arrangement including fluid pressure generating means and a hydraulic actuator for propelling another machine element, said fluid pressure generating means being operable in response to the functioning of the motor in said electrical circuit arrangement, and control mechanism for said fluid and electrical circuits adapted to be initiated as an incident to the functioning of said fluid circuit for controlling the duration of flow in said fluid and electrical circuits.

46. In a transmission an electrical circuit arrangement including a reversible electric motor for imparting a driving action to a machine element, a fluid circuit arrangement including fluid pressure generating means and a hydraulic actuator for propelling another machine element, said fluid pressure generating means being operable in response to the functioning of the motor in said electrical circuit arrangement, a second fluid circuit arrangement including fluid pressure generating means for propelling said second machine element at a faster rate of speed, and control mechanism for said fluid and electrical circuits adapted to be initiated as an incident to the functioning of at least one of said fluid circuits for causing said electric motor to experience a reverse driving torque.

47. In a control system for governing the duration and directional effect of flow in an electrical circuit which includes a directional motor, a fluid operated actuator, fluid power means for shifting said actuator, a fluid control mechanism for initiating the shifting of said actuator, electrical circuit controlling means connected with said fluid operated actuator, an electromagnetic controller operable as an incident to the functioning of said electrical circuit controlling means for starting said motor and for selecting the direction of motor torque, and another controlling means for causing said electromagnetic controller to arrest the flow of the current in said motor.

48. In a control system for governing the duration and directional effect of flow in an electrical circuit which includes a reversible motor, a fluid operated actuator, fluid power means for shifting said actuator, a fluid control mechanism for initiating the shifting of said actuator, electrical circuit controlling means connected with said fluid operated actuator, an electromagnetic controller operable as an incident to the functioning of said electrical circuit controlling means for starting said motor and for selecting the direction of motor torque, and another electrical control means driven in response to the actuation of said motor for controlling the duration of current flow when the direction of said motor torque is altered.

49. In an electrical control device the combination of a hydraulic actuator including a relatively shiftable cylinder and piston structure, a shiftable electrical contactor adapted for direct actuation by said hydraulic actuator, and fluid control means for controlling the shifting of said hydraulic actuator and the consequent actuation of said contactor.

50. In an electrical control device for controlling the functioning of an electrical circuit in synchronism with the reversal of a rotary member, a driven rotary member adapted to be rotated in forward and reverse directions, a friction member adapted to be frictionally coupled for rotation with said rotary member, power means for automatically shifting said friction member, into frictional engagement with said rotary member, an electrical contactor operatively associated with said friction member, and control means for timingly governing the predetermined functioning of said power means and the consequent frictional coupling of said friction member with said rotary member, whereby said contactor is actuated in synchronism with the period of reversal of the rotary member.

51. In a hydraulic actuator system for actuating a supporting member and the like, a prime mover, a fluid actuator including a relatively shiftable cylinder and piston structure, and a pumping mechanism driven by said prime mover, said pumping mechanism including inlet and outlet ports connectable with said actuator in a closed circuit, a plurality of reciprocable pistons, hydraulically actuated valve means for controlling the shifting of said pistons in one direction, an eccentric driving member for shifting the pistons in the opposite direction and for controlling the speed of shifting of said pistons in the first direction, whereby to impart a linear speed to said fluid actuator which is constantly proportional to the speed of movement of said prime mover.

52. In a hydraulic actuator system for propelling a supporting member or the like, an actuator including a relatively shiftable cylinder and piston structure, and a variable displacement pumping mechanism having intake and outlet ports connectable to said actuator in a closed circuit, said variable displacement pumping mechanism having a plurality of pistons, hydraulically actuated valve means for controlling the shifting of said pistons in one direction, an adjustable rotary eccentric member for shifting the pistons in the opposite direction and for controlling the speed of shifting in said direction, whereby fluid may be sealed from leakage and fluid presure maintained on both sides of said actuator, the linear speed of said actuator being synchronized with the rotative speed of said eccentric member.

53. In a machine tool transmission the combination of a variable speed and reversible electrical prime mover, a supporting spindle, bearing means for said spindle, a coupling element between said prime mover and said spindle whereby the spindle is drivingly connected to said prime mover in one direction and automatically disconnected with respect to said prime mover when it is rotated in the opposite direction, and electrical control means adapted to electrically connect said prime mover for reverse actuation and to vary the speed thereof, said electrical control means also including starting and stopping control elements.

54. In a machine tool, a rotary spindle, a rotary electric motor for rotating said spindle, a support, a shiftable hydraulic actuator arranged and constructed to cause relative movement between the spindle and the support, pumping means for propelling said actuator at feeding and rapid traverse rates, shiftable valve means for controlling the movements and speed of travel of the hydraulic actuator, electrical control and circuit means for the motor including means for directing current to the motor to cause rotation thereof in a given direction when the hydraulic actuator is shifted and for causing a breaking action upon the motor when the hydraulic actuator reaches a predetermined position, and a control device operated by the rotation of the motor for controlling the action of said electrical control and circuit means.

55. In a machine tool, a rotary spindle, a rotary electric motor for rotating said spindle, a support, a shiftable reciprocable hydraulic actuator arranged and constructed to cause relative reciprocable movement between the spindle and the support, pumping means for propelling said actuator at feeding and rapid traverse rates, shiftable valve means for controlling the movements and speed of travel of the hydraulic actuator, electrical control and circuit means for directing current to the motor to cause rotation thereof in a given direction when the hydraulic actuator is shifted and for reversing the current effect upon the motor when the hydraulic actuator reaches a predetermined position, and an electrical contactor operated by the rotation of the motor for terminating the reverse current effect.

56. In a machine tool, a rotary spindle, a rotary electric motor for rotating said spindle, a support, a shiftable hydraulic actuator arranged and constructed to cause relative movement between the spindle and the support, pumping means for propelling said actuator at feeding and rapid traverse rates, means for automatically stopping the feeding of the actuator if the spindle motor stops, shiftable valve means for controlling the movements and speed of travel of the hydraulic actuator, electrical control and circuit means for directing current to the motor to cause rotation thereof in a given direction when the hydraulic actuator is shifted for feeding and for reversing the current effect upon the motor when the hydraulic actuator completes its feeding movement, and a control device operated by the rotation of the motor for terminating the reverse current effect.

57. In a machine tool, a rotary spindle, a rotary electric motor for rotating said spindle, a support, a shiftable hydraulic actuator arranged and constructed to cause relative movement between the spindle and the support, pumping means for propelling said actuator at feeding and rapid traverse rates, shiftable valve means and hydraulic circuits for controlling the movements and speed of travel of the hydraulic actuator, electrical control and circuit means for directing current to the motor to cause rotation thereof in a given direction when the hydraulic actuator is shifted for feeding and for reversing the current effect upon the motor when the hydraulic actuator completes its feeding movement, and a control device operated by the rotation of the motor for terminating the reverse current effect, and dwell mechanism including a restricted orifice in the hydraulic circuits for delaying movement of the hydraulic actuator at the end of its feeding movement.

58. In material working apparatus, a bearing structure, a supporting spindle rotatable within said bearing structure, a machine element, an electric motor for driving said spindle, a hydraulic actuator for imparting relative translation between the machine element and spindle, a feed pump for imparting feeding movement to said actuator, pump driving means for synchronizing the rotative speed of said spindle and feed pump, a rapid traverse pump for imparting another speed to said actuator, driving means such as an electric motor for said rapid traverse pump, and control means whereby the functioning of said rapid traverse pump driving means may be controlled independently of said feed pump.

59. An actuator system for machine tools and the like including a hydraulic actuator for shifting a machine part, a rotary spindle, an electric motor for rotating said spindle, a feed pump driven in synchronism with said spindle for imparting feeding movement to said hydraulic actuator, pump driving means for synchronizing the rotative speed of said spindle and feed pump, a rapid traverse pump for imparting another speed to said actuator, a prime mover such as an electric motor for driving said rapid traverse pump, and control means for selectively governing the operative functioning of said pumps and for arresting the operative functioning of said rapid traverse pump during a predetermined cycle of operation of said hydraulic actuator.

60. An actuator system for machine tools and the like including a hydraulic actuator for shifting a machine part, a rotary spindle, an electric motor for rotating said spindle, a feed pump driven in synchronism with said spindle for imparting feeding movement to said hydraulic actuator, a rapid traverse pump for imparting another speed to said actuator, a prime mover such as an electric motor for driving said rapid traverse pump, and control mechanism whereby the rotation of the spindle prime mover may be automatically arrested without affecting the operative functioning of the rapid traverse pump motor.

61. In a fluid transmission system for machine tools and the like, a first fluid power circuit including fluid pressure generating means therefor, driving means for said fluid pressure generating means, control mechanism for said circuit including a shiftable plunger within a housing for determining the starting and stopping of fluid flow in said circuit, a second fluid pressure generating means, driving means for said second fluid pressure generating means independent of the first mentioned driving means including a variable speed prime mover such as an electric motor, and shiftable means responsive to said control mechanism for causing said second fluid generating means to operatively function for propelling purposes.

62. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, means connecting said transmissions to effect uninterrupted synchronized movement of said transmissions, a source of driving power supply common to both transmissions, independent means for imparting relative rapid traverse to said actuator member without affecting said connection of said transmissions, and an electrical control mechanism including manual control means for said mechanism for governing the timed functioning of said transmissions.

63. In a metal working apparatus, a rotary supporting means, transmission means for delivering power to said supporting means, a second supporting means relatively movable with respect to said rotary supporting means, a shiftable actuator member for causing said relative movement, a feed transmission for delivering propelling power to said actuator member, means positively connecting said transmissions to effect uninterrupted synchronized movement of said transmissions when variation in load is experienced by at least one of said supporting means, a source of driving power supply common to both transmissions, independent means for imparting relative rapid traverse to said actuator member without affecting said positive connection of said transmissions, an electric motor for driving said independent means, and a control mechanism including a remote control member for governing the timed functioning of said transmissions.

64. In a metal working apparatus, a rotary supporting means, transmission means for delivering power to said supporting means, a second supporting means relatively movable with respect to said rotary supporting means, a shiftable actuator member for causing said relative movement, an adjustable transmission driven by said rotary supporting means, electrical means for controlling the automatic starting and stopping the rotation of said rotary supporting means, whereby to effect synchronized starting and arresting of both the adjustable transmission and the relatively movable supporting means, a source of driving power supply common to both transmissions, independent means for imparting relative rapid traverse to said actuator member without affecting the connection between said transmissions, and a magnetic control mechanism including a remote control device for governing the timed functioning of said transmissions.

65. In a fluid transmission system for machine tools and the like, a first fluid power circuit including fluid pressure generating means therefor, control mechanism including a shiftable plunger within a housing for determining the direction of fluid flow in said circuit and control circuit means for causing said plunger to be shifted to its reverse position, a second fluid power circuit including a second fluid pressure generating means, a magnetic control mechanism for automatically initiating the fluid flow in said second circuit, and power operated control means for governing the functioning of said magnetic control mechanism.

66. In a fluid transmission system for machine tools and the like, a first fluid power circuit including rapid traverse fluid pressure generating means, an electric motor for driving said fluid pressure generating means, a second fluid power circuit including slow traverse fluid pressure generating means which is adapted to be functionally operable independently of said rapid traverse fluid pressure generating means, an electric motor for driving said slow traverse fluid pressure generating means, means operable in response to the fluid flow in said first fluid circuit to render said slow traverse fluid pressure generating means functionally effective, and means for reversing the fluid flow in said second circuit.

67. In a fluid transmission system for machine tools and the like, a hydraulic actuator member, two sources of fluid supply, means for conducting fluid from said sources to said actuator for propelling purposes, control means operable for enabling the fluid from both of said sources simultaneously to act upon said actuator member during a predetermined movement of said actuator member including means operable in response to the shifting of said actuator member by the action of fluid from both of said sources to permit the positive continued movement of said actuator member under the influence of fluid from only one of said sources, and a unitary control means for reversing the fluid flow from both of said sources of fluid supply.

68. In a hydraulic actuator system for moving machine parts and the like, a fluid operated actuator, a low pressure fluid power circuit connected to said actuator including fluid pressure generating means for imparting rapid traverse thereto in opposite directions, a high pressure fluid power circuit including adjustable fluid pressure generating means connected with said actuator for imparting slower feeding movement thereto at various rates in both directions, each of said circuits being adapted to function independently of the other, means for selectively controlling the functioning of said circuits in both directions, and electrical control means for the initiating and stopping of the fluid flow in said high pressure circuit.

69. In material working apparatus, rotary supporting means, driving means therefor including a variable speed prime mover such as an electric motor, a variable displacement plunger pump driven in synchronism with said supporting means, magnetically actuated control means for starting and stopping the rotation of said prime mover, said plunger pump being operable automatically when rotation is imparted to said prime mover, and a remote control device for controlling said starting and stopping means.

70. An apparatus of the class described including a spindle, a fluid operated actuator, and a fluid propelling mechanism having means provided therein for sealing against leakage whereby to adapt said mechanism to impart a speed to said actuator which is constantly proportional to the speed of rotation of said spindle, said propelling mechanism and actuator being included within a closed circuit, said propelling mechanism being operable automatically in response to the rotation of said spindle, a variable speed prime mover such as an electric motor for driving said spindle and said propelling mechanism including magnetically actuated control means for starting and stopping said prime mover, and other means for controlling the speed of said prime mover.

71. In a hydraulic actuator system for controlling the movement of machine parts and the like, a hydraulic actuator including a piston within a cylinder, fluid propelling mechanism for delivering fluid under relatively high pressure to propel the actuator at a feeding rate, a variable speed prime mover for driving said fluid propelling mechanism, a second relatively low pressure fluid propelling mechanism for propelling said actuator at a rapid rate, shiftable valve means for selectively controlling the delivery of fluid from the low pressure fluid propelling mechanism to the actuator, said valve means serving in one shifted position to render said propelling mechanism functionally inoperative for propelling purposes with respect to said hydraulic actuator, restriction means for receiving fluid discharged from said actuator during the rapid traverse movement thereof, whereby, upon the termination of the movement of the actuator at a rapid rate, the high pressure fluid is maintained operative for propelling purposes during the feeding movement of said actuator, and mechanism for controlling said variable speed prime mover, including electrical means for rapidly stopping said prime mover.

72. In a hydraulic actuator system for moving machine parts and the like, a fluid operated actuator, a low pressure fluid circuit connectable with said actuator for imparting rapid traverse thereto, a high pressure fluid circuit connectable with said actuator for imparting slower feeding movement thereto, each of said circuits being adapted to function independently of the other, means for selectively controlling the functioning of said circuits including valve means, and electrical power means for starting and stopping the fluid flow in said high pressure fluid circuit.

73. In a hydraulic actuator system for moving machine parts and the like, a fluid operated actuator, a circuit including fluid propelling means for imparting rapid traverse to said actuator, a second circuit including a fluid propelling means for imparting feeding movement to said actuator, a variable speed prime mover such as an electric motor for actuating, starting, and stopping the propelling mechanism in said second circuit, and means operable in response to the functioning of said first mentioned circuit for causing the second mentioned circuit to operatively function for propelling purposes.

74. In a material working apparatus, rotary supporting means, a variable speed prime mover such as an electric motor directly driving said supporting means, a variable displacement plunger pump driven in response to the rotation of said prime mover, and magnetically actuated control means for starting and stopping said prime mover whereby said plunger pump is operable automatically when rotation is imparted to said prime mover.

75. In material working apparatus, a rotary supporting means, a prime mover such as an electric motor for driving said supporting means, a fluid propelling mechanism driven in timed relation with said supporting means, a fluid operated actuator, said fluid propelling mechanism being adapted to impart a speed to said fluid operated actuator which is constantly proportional to the rotary speed of said rotary supporting means, ducts connecting said fluid propelling mechanism with said actuator whereby, in response to rotation of the supporting means, the fluid propelling mechanism operates automatically to propel the actuator, and electrical control means for automatically starting and stopping said prime mover.

76. In material working apparatus, a spindle, a variable speed electrical prime mover for directly driving said spindle, a fluid operated actuator, a fluid propelling mechanism adapted to impart a speed to the fluid operated actuator which is constantly proportional to the speed of movement of said spindle, said propelling mechanism and actuator being included within a closed fluid circuit, and a magnetically actuated means for starting and stopping said prime mover and, as an incident thereto, starting and stopping said fluid propelling mechanism.

77. In material working apparatus, a rotary supporting means, a prime mover such as an electric motor for directly driving said rotary supporting means, a variable displacement pump driven in synchronism with the rotary supporting means, a fluid operated actuator connected with said variable displacement pump, an adjustable gear pump connected with said fluid operated actuator, whereby the displacement of fluid to said actuator from said gear pump may be adjustably controlled, means for selectively controlling the functioning of said pumps with respect to said actuator, and magnetically actuated means for controlling the starting and stopping of said prime mover including remote control means for said magnetically actuated control.

78. In material working apparatus, a rotary supporting means, a prime mover such as an electric motor mounted directly upon and encircling said rotary supporting means, means directly connecting said motor shaft with said supporting means, a variable displacement pump, a fluid operated actuator connected with said variable displacement pump, an adjustable gear pump connected with said fluid operated actuator, whereby the displacement of fluid to said actuator from said gear pump may be adjustably controlled, means for selectively controlling the functioning of said pumps with respect to said actuator, and magnetically actuated means for controlling the starting and stopping of said prime mover including remote control means for said magnetically actuated control.

79. In a hydraulic actuator system for moving machine parts and the like, a fluid operated actuator, a low pressure circuit connectable with said actuator for imparting rapid traverse thereto, a high pressure fluid circuit connectable with said actuator for imparting a slower feeding movement thereto, a second fluid operated actuator connected with said low and high pressure circuits, a magnetically actuated control means for starting and stopping the fluid flow in said high pressure circuit, and other control means for starting and stopping the fluid flow in said low pressure fluid circuit.

80. In material working apparatus, a rotary supporting means, a variable speed electrical prime mover such as an electric motor for directly driving said rotary supporting means, a variable delivery fluid propelling mechanism driven in synchronism with said rotary supporting means, a shiftable carriage, a fluid operated actuator for moving said carriage, one extremity of said actuator being connected with the intake side of said fluid propelling mechanism, and the opposite extremity of said actuator being connected with the outlet side of said mechanism, a second carriage, a fluid operated actuator for moving said second carriage, and a magnetically actuated control mechanism for automatically governing the starting and stopping of said variable speed electrical prime mover.

81. A system of hydraulic control including a hydraulic actuator, a relatively high pressure pumping mechanism for imparting feeding movement to said actuator, a variable speed electrical prime mover such as an electric motor for driving said relatively high pressure pumping mechanism, a second pumping mechanism for imparting rapid traverse to said actuator, a control mechanism for rendering the second pumping mechanism functionally inoperative for propelling purposes with respect to the actuator during the functioning of the first mentioned pumping mechanism, and manual control means for varying the speed of said prime mover.

82. In a hydraulic actuator system for moving machine parts and the like, a hydraulic actuator including a piston within a cylinder, fluid propelling means for imparting feeding movement to said actuator, a variable speed electrical prime mover such as an electric motor for driving said fluid propelling means, a second fluid propelling means for imparting rapid traverse to said actuator, an electrical control means for starting and stopping and varying the speed of said prime mover, and valve means for rendering the second mentioned propelling means functionally inoperative for propelling purposes with respect to the actuator piston during the operative functioning of the other propelling means.

83. In a hydraulic actuator system for moving machine parts and the like, a hydraulic actuator including a piston within a cylinder, fluid propelling means for delivering fluid under pressure at a substantially uniform rate to one side of the actuator piston, means for directing fluid from the opposite side of said piston to the intake side of said fluid propelling means, the fluid from the discharge side of said actuator being sufficient to charge the intake side of said fluid propelling means, whereby said actuator experiences constant linear travel in accordance with the uniform delivery of fluid by said fluid propelling means, a variable speed prime mover directly coupled for driving purposes to said fluid propelling means and magnetically actuated control means for starting and stopping said prime mover.

84. In material working apparatus, a variable speed prime mover, a hydraulic actuator including a piston within a cylinder, fluid propelling mechanism driven in timed relation with said prime mover and adapted to impart a linear movement to the actuator at a speed which is constantly in synchronism with the speed of travel of said prime mover, fluid conducting means sealed from air connecting said fluid propelling mechanism with said hydraulic actuator, magnetically actuated control means for automatically starting and stopping said prime mover, and other means for varying the speed of said prime mover.

85. A hydraulic actuator system comprising a hydraulically operated actuator, a low pressure circuit for imparting rapid traverse to said actuator, a high pressure circuit for imparting slower feeding movement thereto, a valve mechanism including a plunger within a housing in the low pressure circuit for controlling the movement of said actuator, another control plunger within said high pressure circuit shiftable in response to the movement of said first valve plunger for controlling the direction of fluid flow in said high pressure circuit, and electrical means for automatically starting and stopping fluid flow in said high pressure circuit.

86. In a hydraulic actuator system for controlling the movements of machine parts and the like, a hydraulic actuator including a piston and cylinder relatively movable with respect to each other, a hydraulic feeding circuit, a hydraulic rapid traverse circuit, a constantly driven rapid traverse pump within said latter circuit, a feed pump within said feeding circuit, a variable speed electrical prime mover drivingly connected with said feed pump, shiftable means operable in accordance with the direction of fluid flow in the rapid traverse circuit for controlling the direction of fluid flow from said feed pump to said hydraulic actuator, and magnetically actuated control means for starting and stopping the fluid flow in said feeding circuit.

87. In a hydraulic actuator system for controlling the movements of machine parts and the like, a hydraulic actuator including a piston and cylinder relatively movable with respect to each other, a rotary spindle, an electrical prime mover such as an electric motor for driving said spindle, a feed pump driven in synchronism with said spindle, said feed pump being connected with said actuator for propelling same at a feeding rate, means for imparting rapid movement to said actuator, and means for automatically effecting the arresting of the movement of the prime mover and consequently the flow of fluid from the feed pump to said actuator during the rapid traverse of said actuator.

88. A system of hydraulic control including a hydraulic actuator, a relatively high pressure pumping mechanism for imparting feeding movement to said actuator, a variable speed electrical prime mover drivingly connected with said high pressure pumping mechanism, a second pumping mechanism for imparting rapid traverse to said actuator, a control mechanism for rendering the second pumping mechanism functionally inoperative for propelling purposes with respect to the actuator during the functioning of the first mentioned pumping mechanism and for rendering the first pumping mechanism operative for propelling said hydraulic actuator in either direction, and other control means for starting and stopping said prime mover.

89. In a fluid transmission system for machine tools and the like, a first fluid power circuit including fluid power generating means therefor, control mechanism including a shiftable plunger within a housing for directing the fluid flow in said circuit, a second fluid power circuit having a second fluid power generating means and including a shiftable plunger within said control housing for starting and directing the fluid flow in said second circuit, a variable speed electrical prime mover connectable with said second fluid power generating means, magnetically actuated control means for starting and stopping said prime mover, and other electrical control means for regulating the speed of said prime mover and causing as an incident to said speed regulation the regulation of the fluid flow in said second circuit.

90. In combination with a machine tool structure, a hydraulic transmission, an electrical transmission, and a single control means adapted when engaged to initiate the automatic timed operation of said hydraulic and electrical transmissions.

ERNEST J. SVENSON.

CERTIFICATE OF CORRECTION.

Patent No. 2,215,257. September 17, 1940.

ERNEST J. SVENSON.

It is hereby certified that error appears in the printed specification of the above numbered patent requiring correction as follows: Page 3, second column, line 25, for "pivotetd" read --pivoted--; line 30, before the word "portion" insert --initial--; page 12, first column, line 46, for "ad" read --and--; page 15, first column, line 13, claim 24, for "moved" read --mover--; line 36, claim 26, strike out "inoperative" and insert the same after "electrically" in line 35, same claim; page 16, first column, line 16, claim 35, before "about" insert --oscillated--; and second column, line 66, claim 44, for "arrengement" read --arrangement--; page 17, first column, line 31, claim 47, for "directional" read --reversible--; and second column, line 72, claim 54, for "breaking" read --braking--; page 18, second column, line 43, claim 61, after "fluid" insert --pressure--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.